United States Patent
Hattori

(10) Patent No.: US 12,386,351 B2
(45) Date of Patent: Aug. 12, 2025

(54) TRANSPORT SYSTEM, MOBILE BODY, TRANSPORT METHOD, TRANSPORT PROGRAM, AND RECORDING MEDIUM

(71) Applicant: HONDA MOTOR CO., LTD., Tokyo (JP)

(72) Inventor: Tatsuya Hattori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 17/599,132

(22) PCT Filed: Mar. 27, 2020

(86) PCT No.: PCT/JP2020/014388
§ 371 (c)(1),
(2) Date: Sep. 28, 2021

(87) PCT Pub. No.: WO2020/203929
PCT Pub. Date: Oct. 8, 2020

(65) Prior Publication Data
US 2022/0155788 A1    May 19, 2022

(30) Foreign Application Priority Data
Mar. 29, 2019  (JP) ................................. 2019-068616

(51) Int. Cl.
*G05D 1/02*      (2020.01)
*B60L 53/66*     (2019.01)
(Continued)

(52) U.S. Cl.
CPC ............ *G05D 1/0212* (2013.01); *B60L 53/66* (2019.02); *B60L 53/68* (2019.02); *B60L 58/13* (2019.02);
(Continued)

(58) Field of Classification Search
CPC .......... B60L 50/64; B60L 50/66; B60L 53/00; B60L 53/36; B60L 53/66; B60L 53/68;
(Continued)

(56) References Cited

U.S. PATENT DOCUMENTS 11,932,261 B2 *   3/2024  Iwamoto .................. B60P 3/07
2003/0209375 A1  11/2003  Suzuki et al.
(Continued)

FOREIGN PATENT DOCUMENTS

DE     102016009572 A1    11/2017
JP     S63-070661 U       5/1988
(Continued)

OTHER PUBLICATIONS

Jun. 16, 2020, International Search Report issued for related PCT application No. PCT/JP2020/014388.
(Continued)

*Primary Examiner* — Peter D Nolan
*Assistant Examiner* — Ce Li Li
(74) *Attorney, Agent, or Firm* — Paratus Law Group, PLLC

(57) ABSTRACT

An energy storage device transport system (1, 1A) includes an energy storage device (40) which can move by self-propelling and a moving body (30) which has an accommodation portion (31) for accommodating the energy storage device (40). In the energy storage device transport system (1, 1A), the moving body (30) accommodates the energy storage device (40) and moves to transport the energy storage device 40. The energy storage device (40) moves inside the accommodation portion (31) of the moving body (30) by self-propelling and changes a position in the accommodation portion (31) of the moving body (30).

21 Claims, 9 Drawing Sheets

(51) Int. Cl.
*B60L 53/68* (2019.01)
*B60L 58/13* (2019.01)
*B65G 67/04* (2006.01)
*G05D 1/00* (2006.01)

(52) U.S. Cl.
CPC .......... *B65G 67/04* (2013.01); *B60L 2240/12* (2013.01); *B60L 2240/14* (2013.01); *B60L 2240/32* (2013.01); *B60L 2240/545* (2013.01); *B60L 2240/68* (2013.01)

(58) Field of Classification Search
CPC .......... B60L 53/80; B60L 55/00; B60L 58/12; B60L 58/13; B60L 58/16; B60L 58/18; B60L 2200/40; B60L 2240/12; B60L 2240/14; B60L 2240/32; B60L 2240/545; B60L 2240/622; B60L 2240/66; B60L 2240/68; B60L 2260/32; B60Y 2200/62; B65G 67/02; B65G 67/04; G05D 1/0212; G05D 1/0287; G05D 1/0295; G05D 2201/0213; G05D 2201/0216; Y02E 60/00; Y02T 10/70; Y02T 10/7072; Y02T 10/72; Y02T 90/12; Y02T 90/14; Y02T 90/16; Y04S 10/126
See application file for complete search history.

(56) References Cited

U.S. PATENT DOCUMENTS

| | | |
|---|---|---|
| 2009/0115161 A1 | 5/2009 | Sato |
| 2019/0092612 A1* | 3/2019 | Soder .................. B66F 9/063 |
| 2019/0236741 A1* | 8/2019 | Bowman ................ G05D 1/692 |
| 2020/0026281 A1* | 1/2020 | Xiao ................. G06Q 10/0631 |
| 2020/0039766 A1* | 2/2020 | Haban ..................... G06Q 10/08 |
| 2022/0009731 A1* | 1/2022 | Haid .................... G06Q 10/083 |

FOREIGN PATENT DOCUMENTS

| | | |
|---|---|---|
| JP | H11-285109 A | 10/1999 |
| JP | 2001-057711 A | 2/2001 |
| JP | 2009-113650 A | 5/2009 |
| JP | 2019-048689 A | 3/2019 |
| WO | WO 2019/049404 A1 | 3/2019 |

OTHER PUBLICATIONS

Jun. 16, 2020, International Search Opinion issued for related PCT application No. PCT/JP2020/014388.

Oct. 28, 2022, European Search Report issued for related EP Application No. 20785006.6.

Ngo et al., Rendezvous Trajectory Generation for Energy Trophallaxis, 2008 10th International Conference on Control, Automation, Robotics and Vision, Dec. 17-20, 2008, pp. 2114-2119, Hanoi, Vietnam.

Zebrowski et al., Recharging Robot Teams: A Tanker Approach, ICAR '05 Proceedings, 12th International Conference on Advanced Robotics 2005. Jul. 18-20, 2005, pp. 803-810, Seattle, WA.

Ngo et al., An Approach to Sociable Robots through Self-distributed Energy, 2006 IEEE/RSJ International Conference on Intelligent Robots and Systems, Oct. 9-15, 2006, pp. 2192-2199, Beijing, China.

Sep. 12, 2023, translation of Japanese Office Action issued for related JP Application No. 2021-512090.

* cited by examiner

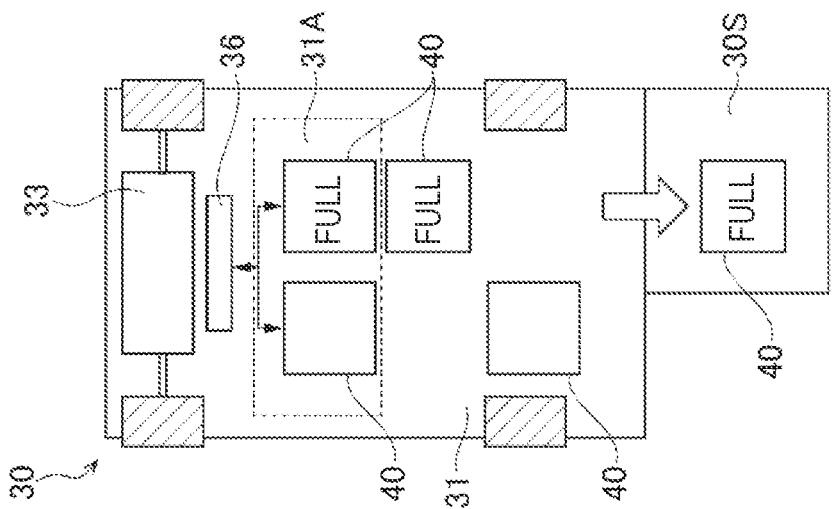
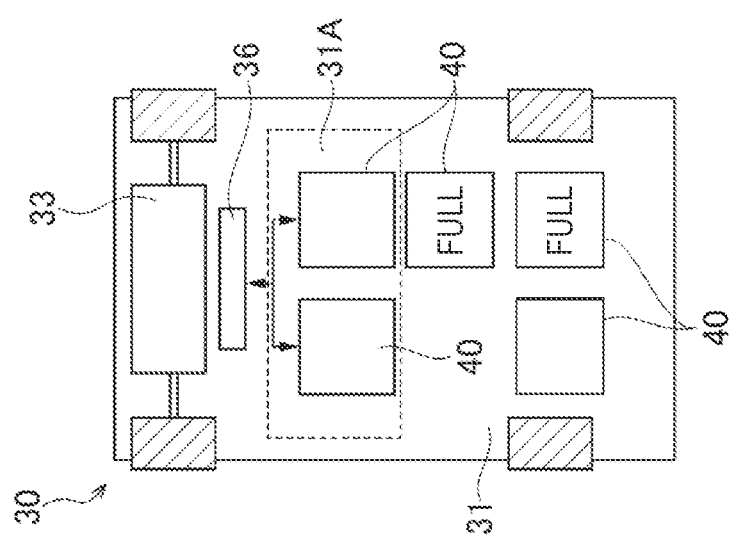
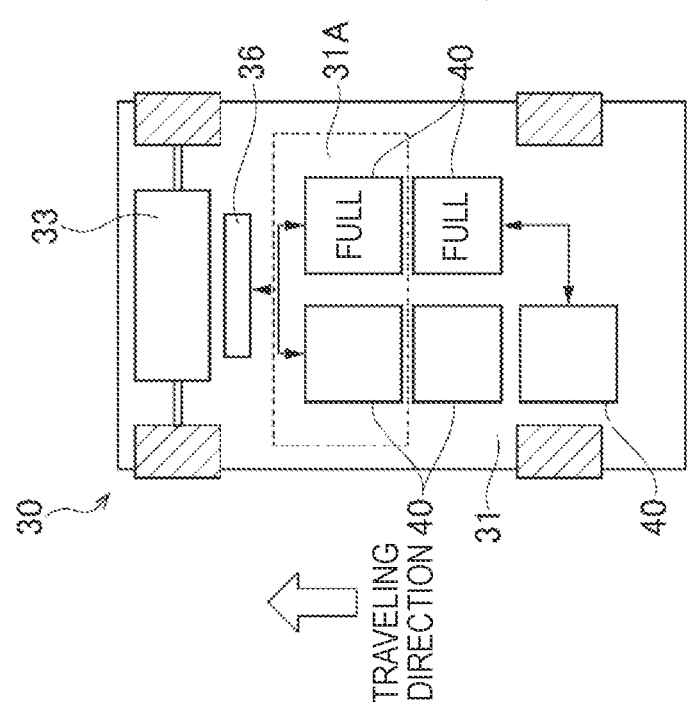

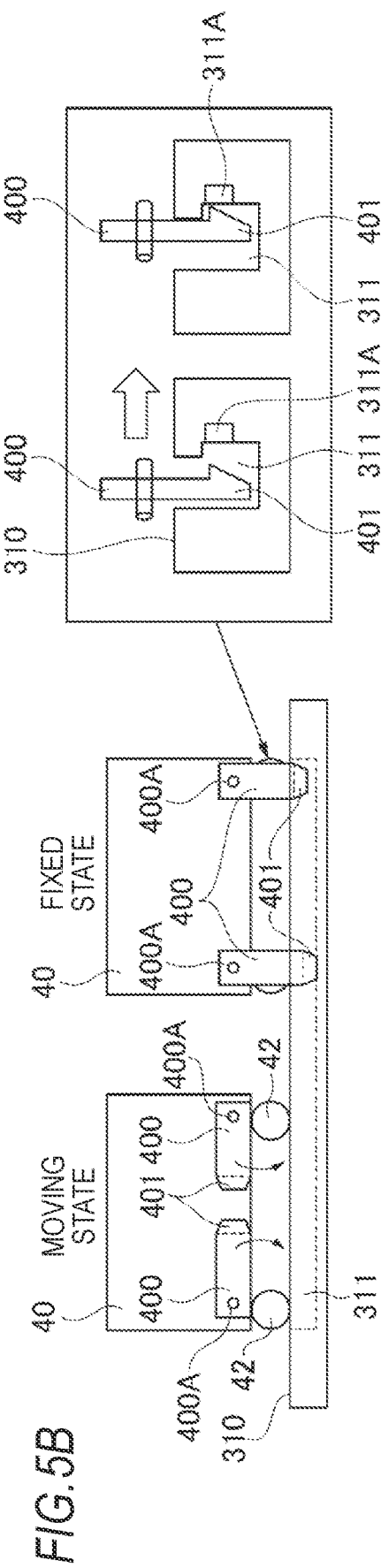

TRANSPORT SYSTEM, MOBILE BODY, TRANSPORT METHOD, TRANSPORT PROGRAM, AND RECORDING MEDIUM

CROSS REFERENCE TO PRIOR APPLICATION

This application is a National Stage Patent Application of PCT International Patent Application No. PCT/JP2020/014388 (filed on Mar. 27, 2020) under 35 U.S.C. § 371, which claims priority to Japanese Patent Application No. 2019-068616 (filed on Mar. 29, 2019), which are all hereby incorporated by reference in their entirety.

TECHNICAL FIELD

The present invention relates to an autonomously movable moving body, a moving body transport system, a transport method, a transport program, and a recording medium on which the transport program is recorded.

BACKGROUND ART

In recent years, due to an increase in power demand and renewable energy supply, a phenomenon has occurred in which an existing system power grid cannot handle the power supply. In addition, due to disruption of the system power grid due to natural disasters, balance between power demand and supply is lost and the system power grid becomes non-functional, so energy crisis management measures are required.

For example, Patent Literature 1 discloses a technique for freely pulling out and mounting a battery on a vehicle body. By using the technique described in Patent Literature 1, the battery can be transported to a transport destination.

RELATED ART LITERATURE

Patent Literature

Patent Literature 1: JP-UM-A-63-070661

SUMMARY OF THE INVENTION

Problem that the Invention is to Solve

In recent years, a logistics flow has increased and a problem of labor shortage in logistics has become remarkable. However, in the technique of Patent Literature 1 of freely pulling out and mounting the battery on the vehicle body, a work of arranging the battery at the optimal position of the vehicle body and a work of engaging and disengaging a battery lock are performed manually, so there is a problem that manpower is required. In addition, it is difficult to quickly arrange and fix the battery in the optimal position of the vehicle body because the work of arranging the battery on the vehicle body and the work of engaging and disengaging the battery lock are manually performed.

The invention provides a transport system, a moving body, a moving body transport method, a moving body transport program, and a recording medium on which the moving body transport program is recorded which allow the moving body to be quickly arranged and fixed in the optimal position of an accommodation portion of another moving body without human intervention.

Means for Solving the Problem

According to a first aspect of the invention, there is provided a transport system which includes a first moving body which can move autonomously and a second moving body which has an accommodation portion for accommodating the first moving body and in which the second moving body accommodates the first moving body and moves to transport the first moving body, where
the first moving body autonomously moves inside the accommodation portion of the second moving body and changes a position in the accommodation portion of the second moving body.

According to a second aspect of the invention, there is provided a moving body capable of autonomously moving which is accommodated in an accommodation portion of another moving body and transported by the other moving body, including,
a position changing unit which autonomously moves inside the accommodation portion and changes a position in the accommodation portion based on at least one of a moving state and an operating state of the other moving body.

According to a third aspect of the invention, there is provided a transport method in which an autonomously movable moving body is accommodated in an accommodation portion of another moving body and transported by the other moving body, including the steps of,
acquiring at least one of a moving state and an operating state of the other moving body, and
changing a position of the moving body in the accommodation portion by autonomously moving the moving body inside the accommodation portion based on at least one of the moving state and the operating state of the other moving body acquired in the step of acquiring.

According to a fourth aspect of the invention, there is provided a transport program for accommodating an autonomously movable moving body in an accommodation portion of another moving body and transporting the moving body by the other moving body, including the steps of,
acquiring at least one of a moving state and an operating state of the other moving body, and
changing a position of the moving body in the accommodation portion by autonomously moving the moving body inside the accommodation portion based on at least one of the moving state and the operating state of the other moving body acquired in the step of acquiring.

Advantages of the Invention

According to the first aspect of the invention, the first moving body autonomously moves inside the accommodation portion of the second moving body and changes the position in the accommodation portion of the second moving body. Therefore, the first moving body can be quickly arranged and fixed in the optimal position in the accommodation portion of the second moving body without human intervention.

According to the second aspect of the invention, the moving body autonomously moves inside the accommodation portion of the other moving body and changes the position in the accommodation portion of the other moving body. Therefore, the moving body can be quickly arranged and fixed in the optimal position of the accommodation portion of the other moving body without human intervention.

According to the third and fourth aspects of the invention, the position of the moving body in the accommodation portion of the other moving body can be changed by autonomously moving the moving body inside the accommodation portion of the other moving body. Therefore, the moving body can be quickly arranged and fixed in the optimal position of the accommodation portion of the other moving body without human intervention.

BRIEF DESCRIPTION OF DRAWINGS

FIGS. 4A, 4B and 4C are a schematic view illustrating movement of the energy storage device inside an accommodation portion of the moving body of FIG. 1.

FIG. 5B is a view illustrating details of the fixing mechanism of FIG. 5A.

MODE FOR CARRYING OUT THE INVENTION

Hereinafter, each embodiment of an energy storage device transport system of the invention will be described with reference to the accompanying drawings.

First Embodiment

First, an energy storage device transport system 1 of a first embodiment of the invention will be described with reference to FIGS. 1 to 6C.

Overall Configuration of Energy Storage Device Transport System>

Figure 1:
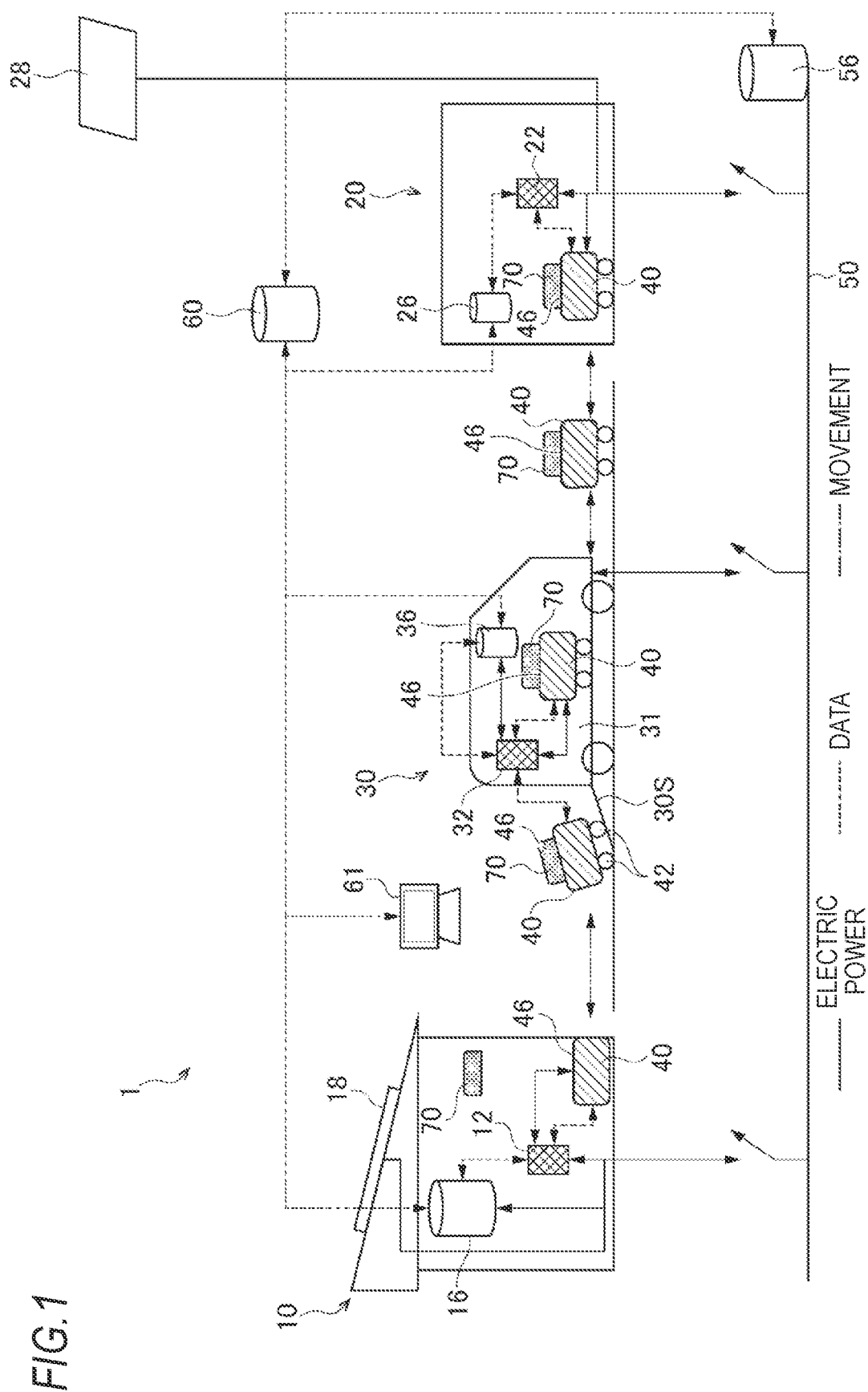
FIG. 1 is a schematic view of an energy storage device transport system according to a first embodiment of the invention.

As illustrated in FIG. 1, the energy storage device transport system 1 according to the embodiment includes a first station 10, a second station 20, a moving body 30, an energy storage device 40, a system power grid 50, and a central information management server 60. The energy storage device transport system 1 is a system in which the moving body 30 accommodates the energy storage device 40 and moves to transport the energy storage device 40 from the first station 10 to the second station 20.

The first station 10 is, for example, a facility or a building such as a house, a warehouse, a charging station, or the like. Further, the first station 10 may be a moving body. The first station 10 includes a first energy management unit 12 which manages the energy in the first station 10 and a first information management terminal 16 which acquires information in the first station 10 and communicates with the central information management server 60. Communication means between the central information management server 60 and the first information management terminal 16 may be wired communication or wireless communication.

The first energy management unit 12 can transmit and receive information between the first information management terminal 16 and the energy storage device 40. The first energy management unit 12 is capable of mutual transfer of electric power with the energy storage device 40 and the system power grid 50. Further, the first energy management unit 12 supplies electric power to the first information management terminal 16.

The first station 10 may be equipped with an out-of-system power generation device 18. The out-of-system power generation device 18 is a power generation device which generates power using renewable energy, such as a solar panel. The electric power generated by the out-of-system power generation device 18 is supplied to the first energy management unit 12 and the first information management terminal 16. Further, the first station 10 may be provided with the out-of-system power generation device 18 and may be separated from the system power grid 50.

The second station 20 is, for example, a facility or a building such as a house, a warehouse, a park, or the like. Further, the second station 20 may be a moving body. The second station 20 includes a second energy management unit 22 which manages the energy in the second station 20 and a second information management terminal 26 which acquires information in the second station 20 and communicates with the central information management server 60. Communication means between the central information management server 60 and the second information management terminal 26 may be wired communication or wireless communication.

The second energy management unit 22 can transmit and receive information between the second information management terminal 26 and the energy storage device 40. The second energy management unit 22 is capable of mutual transfer of electric power with the energy storage device 40 and the system power grid 50. Further, the second energy management unit 22 supplies electric power to the second information management terminal 26.

The second station 20 may be equipped with an out-of-system power generation device 28. The out-of-system power generation device 28 is a power generation device which generates power using renewable energy, such as a solar panel. The electric power generated by the out-of-system power generation device 28 is supplied to the second energy management unit 22 and the second information management terminal 26. Further, the second station 20 may be provided with the out-of-system power generation device 28 and may be separated from the system power grid 50.

The moving body 30 is a vehicle which moves from an area around the first station 10 to an area around the second station 20. The moving body 30 may be a moving body other than a vehicle, and may be, for example, an aircraft, a ship, a general-purpose device, or the like. A moving path of the moving body 30 can be any path, for example, on the ground, in the air, at sea, underwater, in space, and the like.

The moving body 30 includes an accommodation portion 31 which can accommodate a plurality of energy storage devices 40, a slope 30S which is hung between a floor 310 of the accommodation portion 31 and the ground, a third energy management unit 32 which manages the energy of the energy storage device 40 accommodated in the accommodation portion 31, and a third information management terminal 36 which acquires information on the moving body 30 and the energy storage device 40 accommodated in the accommodation portion 31 and communicates with the central information management server 60. Communication means between the central information management server 60 and the third information management terminal 36 may be wired communication or wireless communication. In addition, the moving body 30 is capable of mutual transfer of electric power with the system power grid 50.

The slope 30S of the moving body 30 can be accommodated in the moving body 30 and can be hung between the floor 310 of the accommodation portion 31 and the ground as needed. The slope 30S of the moving body 30 allows the energy storage device 40 to move in and out between the outside of the moving body 30 and the inside of the accommodation portion 31 of the moving body 30 by self-propelling. The slope 30S may be pivotably provided, for example, with a connection portion which is always connected to the floor 310 of the accommodation portion 31 as a fulcrum. This allows the slope 30S to be typically accommodated in the moving body 30 and to be hung on the ground as needed.

The third energy management unit 32 can transmit and receive information between the third information management terminal 36 and the energy storage device 40. The third energy management unit 32 is capable of mutual transfer of electric power with the energy storage device 40 and the system power grid 50. In addition, the third energy management unit 32 supplies electric power to the third information management terminal 36.

The energy storage device 40 is a vehicle equipped with four wheels 42 arranged on the front, rear, left and right sides of the energy storage device 40. The energy storage device 40 can drive the wheels 42 by the energy stored in the energy storage device 40 and can be self-propelled. The energy storage device 40 may be a moving body other than a vehicle which can move autonomously, and may be, for example, an aircraft, a ship, a general-purpose device, or the like. Any path can be adopted as a moving path of the energy storage device 40, for example, on the ground, in the air, at sea, underwater, in space, and the like.

The energy storage device 40 can be charged and discharged via the first energy management unit 12 of the first station 10, the second energy management unit 22 of the second station 20, and the third energy management unit 32 of the moving body 30. Further, the energy storage device 40 can be charged and discharged with a plurality of energy storage devices 40. The charge and discharge may be a contact type connected by a connector, a non-contact type, or a combination of the contact type and the non-contact type. However, in the case of the contact type, it is necessary to standardize a connector shape and to make it waterproof in terms of electrical safety. Therefore, the non-contact type is preferable.

The energy stored in the energy storage device 40 can be used without going through the first energy management unit 12 of the first station 10, the second energy management unit 22 of the second station 20, and the third energy management unit 32 of the moving body 30. For example, the energy storage device 40 is equipped with connection terminals such as outlet plugs of the related art, and by connecting an electronic device or the like to the connection terminal, the electronic device or the like can be operated by using the energy stored in the energy storage device 40.

The energy storage device 40 is charged, for example, at first station 10, and then the energy storage device 40 travels from the first station 10 to the inside of the accommodation portion 31 of the moving body 30 waiting around the first station 10 by self-propelling and is accommodated in the accommodation portion 31 of the moving body 30. Then, the moving body 30 moves from the area around the first station 10 to the area around the second station 20 with the energy storage device 40 accommodated in the accommodation portion 31. Then, the energy storage device 40 exits the accommodation portion 31 of the moving body 30 and travels to the second station 20 by self-propelling. In this way, the energy storage device 40 is transported from the first station 10 to the second station 20. An electronic device or the like may be operated by using the energy stored in the energy storage device 40 around the second station 20 to which the energy storage device 40 is transported.

In this way, the energy storage device 40 is moved from the area around the first station 10 to the area around the second station 20 by the moving body 30, so the energy stored in the energy storage device 40 is not consumed by the movement from the area around the first station 10 to the area around the second station 20. As a result, the energy storage device 40 can be transported to a distant place without increasing the amount of energy that can be stored in the energy storage device 40. In addition, the energy storage device 40 can be transported to the second station 20 with more energy remaining in the energy storage device 40.

The energy storage device 40 includes a loading unit 46 for loading a transported object 70 such as luggage. The transported object 70 loaded on the loading unit 46 of the energy storage device 40 is transported from a transport source to a transport destination. Then, at the transport source and the transport destination, the transported object 70 is loaded on the loading unit 46 of the energy storage device 40, or is unloaded from the loading unit 46 of the energy storage device 40. In the embodiment, the transported object 70 may be loaded on the loading unit 46 of the energy storage device 40 at the first station 10, or may be loaded on the loading unit 46 of the energy storage device 40 at another location.

Since the energy storage device 40 is self-propelled between the first station 10 and the accommodation portion 31 of the moving body 30, and between the accommodation portion 31 of the moving body 30 and the second station 20, the energy storage device 40 can perform the work of accommodating the transported object 70 in the accommodation portion 31 of the moving body 30 and the work of delivering the transported object 70 from the accommodation portion 31 of the moving body 30 to the second station 20 without human intervention.

The system power grid 50 is capable of mutual transfer of electric power with the first energy management unit 12 of the first station 10 and the second energy management unit 22 of the second station 20 and the moving body 30. The system power grid 50 includes a system power information management terminal 56 which acquires the information of the system power grid 50 and communicates with the central information management server 60. Communication means between the central information management server 60 and the system power information management terminal 56 may be wired communication or wireless communication.

The central information management server 60 is capable of information communication with the first information management terminal 16 of the first station 10, the second information management terminal 26 of the second station 20, the third information management terminal 36 of the moving body 30, and the system power information management terminal 56 of the system power grid 50. Furthermore, the central information management server 60 is capable of information communication with a communication device 61. Communication means between the central information management server 60 and the communication device 61 may be wired communication or wireless communication. The communication device 61 is a device which performs information communication with the energy storage device 40. Therefore, the central information management server 60 is capable of information communication with the energy storage device 40 via the communication device 61. The central information management server 60 may sequentially update and store social information such as weather, natural disasters, traffic information, distribution information of people, energy supply and demand information, and distribution status.

The central information management server 60 aggregates and stores the information managed by the first information management terminal 16 of the first station 10, the second information management terminal 26 of the second station 20, the third information management terminal 36 of the moving body 30, the energy storage device 40, and the system power information management terminal 56 of the system power grid 50. The central information management server 60 integrates and controls the energies of the first station 10, the second station 20, the moving body 30, the energy storage device 40, and the system power grid 50 from the aggregated information and social information such as weather, natural disasters, traffic information, distribution information of people, energy supply and demand information, and distribution status which are updated and stored sequentially. Further, the central information management server 60 may control the movement of the moving body 30 and each energy storage device 40.

Energy Storage Device

Figure 2:
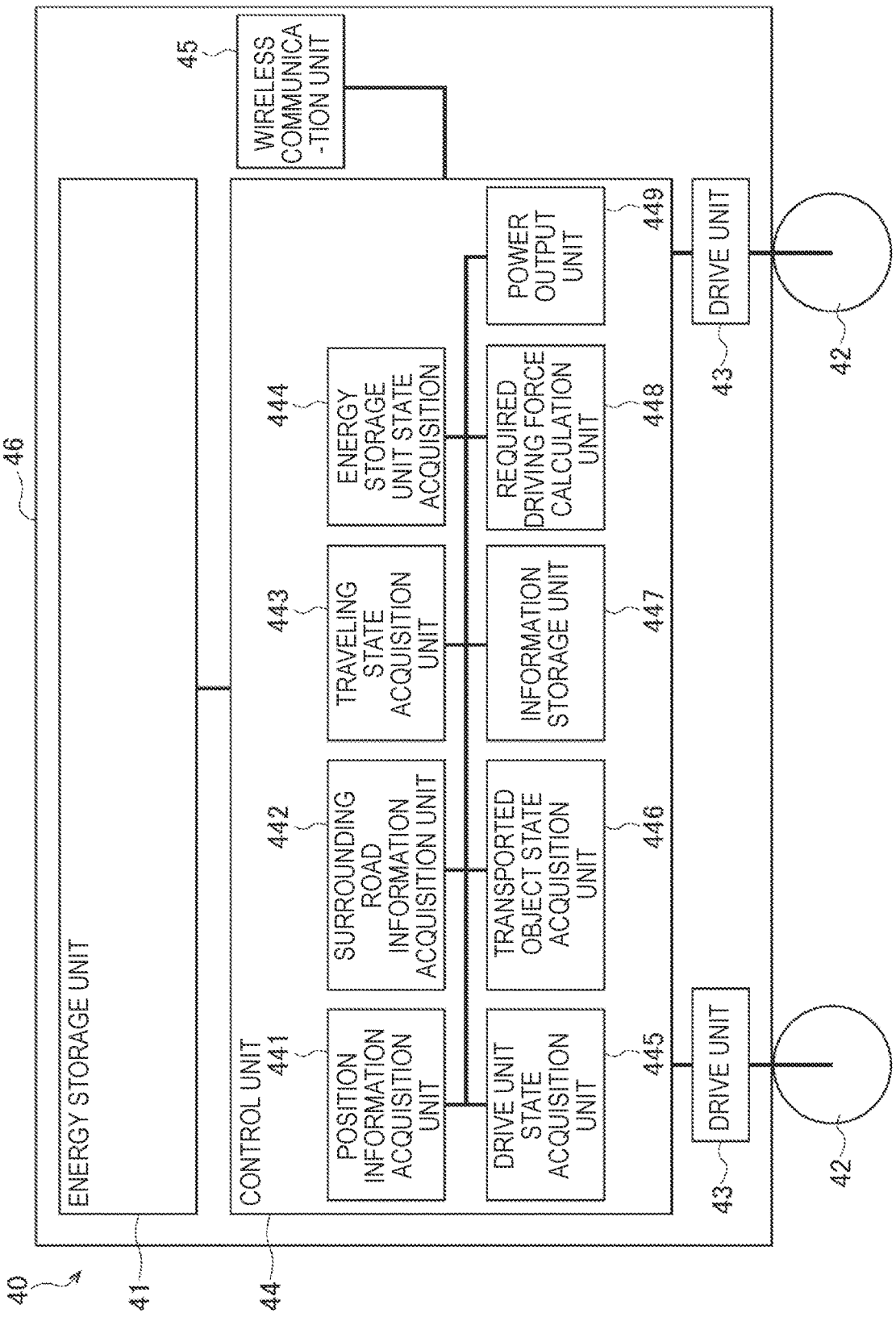
FIG. 2 is a schematic view of an energy storage device of FIG. 1.

As illustrated in FIG. 2, the energy storage device 40 includes an energy storage unit 41, four wheels 42 arranged on the front, rear, left and right sides, a drive unit 43 for driving the wheels 42, a control unit 44 for controlling the drive of the drive unit 43, and a wireless communication unit 45.

The energy storage unit 41 stores energy. The energy stored in the energy storage unit 41 may be electric power, fossil fuels such as coal, petroleum, natural gas, methane hydrate, and shale gas, or hydrogen or the like with which a fuel cell or the like can generate electric power. In the embodiment, the energy storage unit 41 is a battery which stores electric power.

Each wheel 42 arranged on the front, rear, left and right sides of the energy storage device 40 is driven independently. As a result, the energy storage device 40 can be freely moved in any of the front, rear, left and right direction. The wheel 42 may have a tire shape or a spherical shape, and may have any shape which can be moved back and forth and left and right.

The drive unit 43 is provided for each wheel 42 and drives each wheel 42 independently. The drive unit 43 is, for example, an electric motor which is driven by the electric power stored in the energy storage unit 41.

The control unit 44 controls a driving force of the drive unit 43. The control unit 44 converts the electric power stored in the energy storage unit 41 and supplies the electric power corresponding to a required driving force to the drive unit 43.

The wireless communication unit 45 transmits the information acquired by the control unit 44 to the central information management server 60 via the communication device 61 and receives the information transmitted from the central information management server 60 from the communication device 61.

The control unit 44 includes a position information acquisition unit 441, a surrounding road information acquisition unit 442, a traveling state acquisition unit 443, an energy storage unit state acquisition unit 444, a drive unit state acquisition unit 445, a transported object information acquisition unit 446, an information storage unit 447, a required driving force calculation unit 448, and a power output unit 449.

The position information acquisition unit 441 is, for example, a Global Positioning System (GPS) and acquires position information of the energy storage device 40. The position information acquisition unit 441 may be an image recognition device such as a gyro sensor and a camera, or may be a combination thereof.

The surrounding road information acquisition unit 442 is, for example, a camera, and acquires surrounding road environment information of the energy storage device 40. The surrounding road environment information to be acquired is any information that can be acquired, but is, for example, the position information of the slope 30S of the moving body 30, whether or not the slope 30S of the moving body 30 is hung on the ground, and the like.

The traveling state acquisition unit 443 acquires traveling state information of the energy storage device 40. The information on the traveling state to be acquired is, for example, the traveling speed, acceleration, and traveling direction of the energy storage device 40. The traveling state acquisition unit 443 acquires information on the traveling state of the energy storage device 40 based on values detected by, for example, a velocity sensor, an acceleration sensor, and a gyro sensor. When the energy storage device 40 is a moving body other than a vehicle, the traveling state acquisition unit 443 acquires information on a moving state of the energy storage device 40 based on the values detected by, for example, the velocity sensor, the acceleration sensor, and the gyro sensor.

The energy storage unit state acquisition unit 444 acquires information on the state of the energy storage unit 41. The information on the state of the energy storage unit 41 to be acquired is, for example, a remaining energy state (SOC), a charge and discharge state, a deterioration state, a usage history, a temperature, the humidity, and the like.

The drive unit state acquisition unit 445 acquires information on the state of each drive unit 43 provided for each wheel 42. The information on the state of the drive unit 43 to be acquired is, for example, the rotation speed, the output torque, the temperature, and the like.

The transported object information acquisition unit 446 acquires the information of the transported object 70 loaded on the energy storage device 40. The information of the transported object 70 to be acquired is, for example, information on whether the transported object 70 is loaded on the energy storage device 40, and information on the contents of the loaded transported object 70. Information on the contents of the loaded transported object 70 includes, for example, weight, volume, goods, sender, recipient, loading location, destination, desired delivery date, time, and the like. The transported object information acquisition unit 446 is, for example, a weight sensor, an optical sensor, a camera, a two-dimensional code reader, or the like and may be a combination of a plurality of these.

The information storage unit 447 stores individual information of the energy storage device 40. The individual information of the energy storage device 40 to be stored is, for example, individual identification information, manufacturing history information, operation history information, operating state, and the like. In addition, the information acquired by the position information acquisition unit 441, the surrounding road information acquisition unit 442, the traveling state acquisition unit 443, the energy storage unit state acquisition unit 444, the drive unit state acquisition unit 445, and the transported object information acquisition unit 446 may be stored in the information storage unit 447 as needed. Further, map information may be stored in the information storage unit 447.

The required driving force calculation unit 448 calculates the required driving force of each drive unit 43 provided for each wheel 42 based on the information acquired by the position information acquisition unit 441, the surrounding road information acquisition unit 442, the traveling state acquisition unit 443, the energy storage unit state acquisition unit 444, the drive unit state acquisition unit 445, and the transported object information acquisition unit 446 and the information stored in the information storage unit 447. The required driving force calculation unit 448 may calculate the required driving force of each drive unit 43 provided for each wheel 42 based on the information transmitted from the central information management server 60.

The power output unit 449 outputs the power corresponding to the required driving force of each drive unit 43 calculated by the required driving force calculation unit 448 to each drive unit 43. The power output unit 449 is, for example, a power conversion device such as an inverter device.

Moving Body

Figure 3:
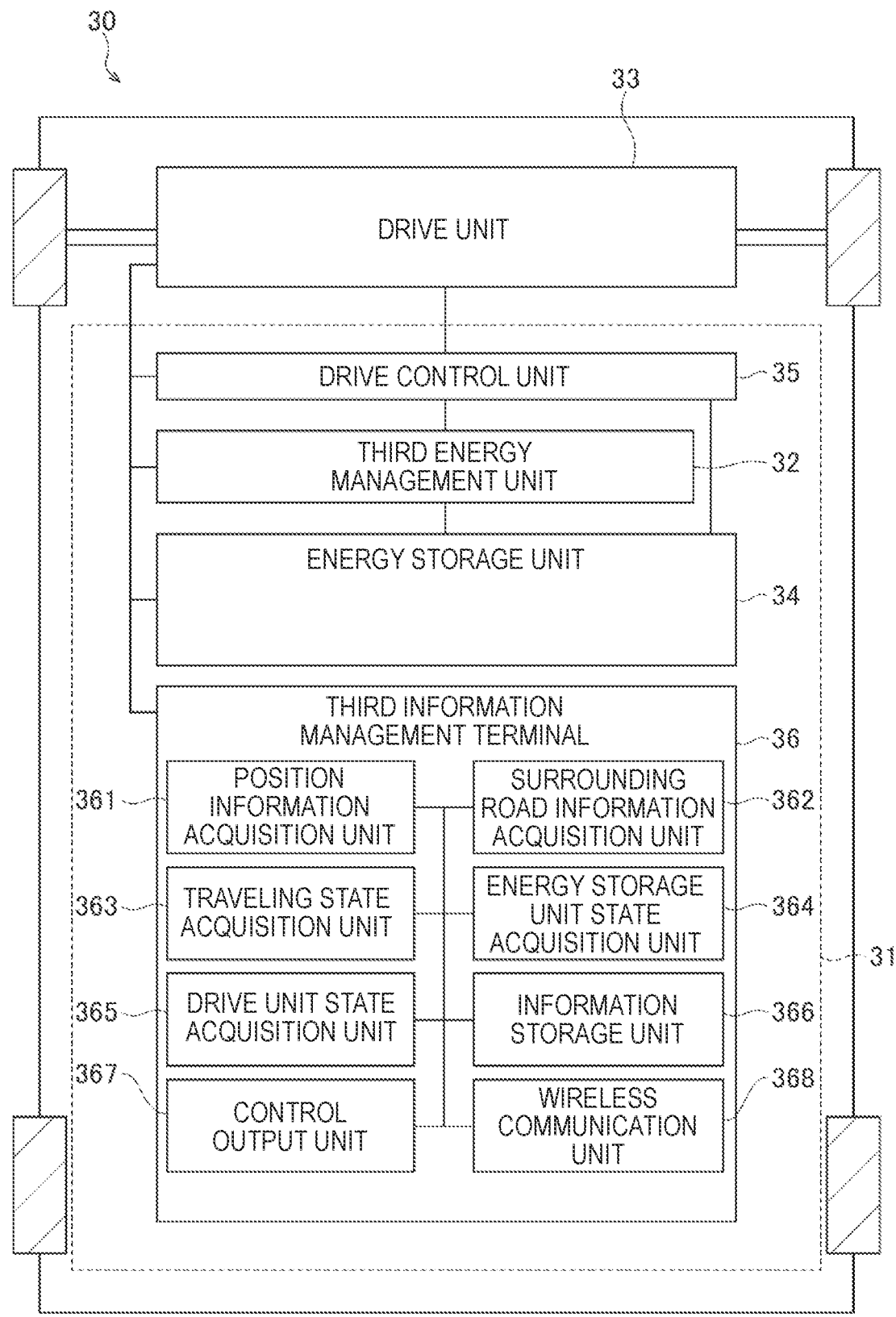
FIG. 3 is a schematic view of a moving body of FIG. 1.

As illustrated in FIG. 3, the moving body 30 of the embodiment includes the accommodation portion 31 for accommodating a plurality of energy storage devices 40, the third energy management unit 32 which manages the energy of the energy storage device 40 accommodated in the accommodation portion 31, a drive unit 33 which drives the moving body 30, an energy storage unit 34 which stores energy to drive the drive unit 33, a drive control unit 35 which controls a driving force of the drive unit 33, and the third information management terminal 36. In the embodiment, the moving body 30 is a vehicle traveling on the road by a wheel.

The energy storage unit 34 stores the energy which drives the moving body 30. The energy stored in the energy storage unit 34 may be electric power, fossil fuels such as coal, petroleum, natural gas, methane hydrate, and shale gas, or hydrogen or the like with which a fuel cell or the like can generate electric power. The energy stored by the energy storage unit 34 is preferably the same as the energy stored by the energy storage unit 41 of the energy storage device 40. In the embodiment, the energy storage unit 34 is a battery which stores electric power.

The drive unit 33 drives the moving body 30 by the energy stored in the energy storage unit 34. In the embodiment, the drive unit 33 is provided with, for example, an electric motor which is driven by the electric power stored in the energy storage unit 34, and the wheel is driven by the electric motor.

The third energy management unit 32 is connected to the energy storage unit 34. Then, the energy storage unit 34 and the energy storage device 40 accommodated in the accommodation portion 31 can be charged and discharged from each other via the third energy management unit 32. The charge and discharge may be a contact type, a non-contact type, or a combination of the contact type and the non-contact type. In addition, the third energy management unit 32 can transmit and receive information to and from the third information management terminal 36. In addition, the third energy management unit 32 can transmit and receive information to and from the energy storage device 40 accommodated in the accommodation portion 31.

The third information management terminal 36 includes a position information acquisition unit 361, a surrounding road information acquisition unit 362, a traveling state acquisition unit 363, an energy storage unit state acquisition unit 364, a drive unit state acquisition unit 365, an information storage unit 366, a control output unit 367, and a wireless communication unit 368.

The position information acquisition unit 361 is, for example, a Global Positioning System (GPS) and acquires the position information of the moving body 30. The position information acquisition unit 361 may be an image recognition device such as a gyro sensor and a camera, or may be a combination thereof.

The surrounding road information acquisition unit 362 is, for example, a camera and acquires surrounding road environment information of the moving body 30. The surrounding road environment information to be acquired is any information that can be acquired, but is, for example, weather, road surface conditions such as slope and μ (slipperiness), and a movement environment information such as traffic information. Traffic information includes, for example, a signal indication ahead, a road sign ahead, a velocity limit, a lane, a road sign, accident information, traffic regulation, traffic jam information, presence or absence of a preceding vehicle, the movement of other vehicles in the vicinity, and the like.

The traveling state acquisition unit 363 acquires information on the traveling state of the moving body 30. The information on the traveling state to be acquired is, for example, the traveling speed, acceleration, and traveling direction of the moving body 30. The traveling state acquisition unit 363 acquires information on the traveling state of the moving body 30 based on the values detected by, for example, the velocity sensor, the acceleration sensor, and the gyro sensor. When the moving body 30 is a moving body other than a vehicle, the traveling state acquisition unit 363 acquires information on the moving state of the moving body 30 based on the values detected by, for example, the velocity sensor, the acceleration sensor, and the gyro sensor.

The energy storage unit state acquisition unit 364 acquires the information on the state of the energy storage unit 34. The information on the state of the energy storage unit 34 to be acquired is, for example, a remaining energy state (SOC), a charge and discharge state, a deterioration state, a temperature, the humidity, and the like.

The drive unit state acquisition unit 365 acquires the information on a state of the drive unit 33. The information on the state of the drive unit 33 to be acquired is, for example, the rotation speed, the output torque, the temperature, and the like.

The information to be acquired by the position information acquisition unit 361, the surrounding road information acquisition unit 362, the traveling state acquisition unit 363, the energy storage unit state acquisition unit 364, and the drive unit state acquisition unit 365 may be acquired by detecting using a sensor or the like, or may be acquired by estimation from other detected information.

The information storage unit 366 stores the individual information of each energy storage device 40 stored in the information storage unit 447 of each energy storage device 40 accommodated in the accommodation portion 31. The individual information of each energy storage device 40 is acquired through the third energy management unit 32 and stored in the information storage unit 366. As a result, the information storage unit 366 can also obtain information on the accommodation status of the energy storage device 40 of the accommodation portion 31. In addition, the information acquired by the position information acquisition unit 361, the surrounding road information acquisition unit 362, the traveling state acquisition unit 363, the energy storage unit state acquisition unit 364, and the drive unit state acquisition unit 365 may be stored in the information storage unit 366 as needed. Further, the information storage unit 366 may store the total weight of the moving body 30 and the operation history. In addition, map information may be stored in the information storage unit 366.

The control output unit 367 controls the power output to the drive unit 33 based on the information acquired by the position information acquisition unit 361, the surrounding road information acquisition unit 362, the traveling state acquisition unit 363, the energy storage unit state acquisition unit 364, and the drive unit state acquisition unit 365 and the information stored in the information storage unit 366. The control output unit 367 may control the power output to the drive unit 33 based on the information transmitted from the central information management server 60.

The wireless communication unit 368 transmits the information acquired by the position information acquisition unit 361, the surrounding road information acquisition unit 362, the traveling state acquisition unit 363, the energy storage unit state acquisition unit 364, and the drive unit state acquisition unit 365 and the information stored in the information storage unit 366 to the central information management server 60. Also, the wireless communication unit 368 receives the information sent from the central information management server 60.

Movement of Energy Storage Device

Returning to FIG. 1, when the energy storage device 40 stays at the first station 10 or the second station 20, the energy storage device 40 does not transmit or receive information to or from the central information management server 60 via the communication device 61. In this case, the energy storage device 40 may transmit and receive information to and from the first energy management unit 12 of the first station 10 or the second energy management unit 22 of the second station 20 and may transmit and receive information to and from the central information management server 60 via the first information management terminal 16 of the first station 10 or the second information management terminal 26 of the second station 20.

For example, when the first station 10 and the second station 20 are buildings and the energy storage device 40 stays indoors at the first station 10 or the second station 20, the radio waves of wireless communication may be blocked by the building and the communication state between the energy storage device 40 and the communication device 61 may deteriorate. Even in such a case, the energy storage device 40 transmits and receives information to and from the first energy management unit 12 of the first station 10 or the second energy management unit 22 of the second station 20, and by transmitting and receiving information to and from the central information management server 60 via the first information management terminal 16 of the first station 10 or the second information management terminal 26 of the second station 20, the energy storage device 40 can reliably transmit and receive information to and from the central information management server 60.

The first station 10 is, for example, a power supply facility for the energy storage device 40. The first energy management unit 12 can transmit and receive information to and from the energy storage device 40 which stays at the first station 10. The first information management terminal 16 can store the information acquired by the position information acquisition unit 441, the surrounding road information acquisition unit 442, the traveling state acquisition unit 443, the energy storage unit state acquisition unit 444, the drive unit state acquisition unit 445, and the transported object information acquisition unit 446 of the energy storage device 40 staying at the first station 10 and the information stored in the information storage unit 447 via the first energy management unit 12.

The energy storage device 40 staying at the first station 10 receives power from the first energy management unit 12 and is charged as needed. The power supply from the first energy management unit 12 may be performed by a control command generated by the first energy management unit 12, or by a control command from the central information management server 60.

The fully charged energy storage device 40 staying at the first station 10 starts moving toward the moving body 30 by self-propelling when the moving body 30 arrives near the first station 10. The control when the energy storage device 40 moves toward the moving body 30 may be performed by the control command of the first energy management unit 12 or by the control command from the central information management server 60.

When the energy storage device 40 which arrives at the moving body 30 detects that the slope 30S of the moving body 30 is hung on the ground, the energy storage device 40 climbs the slope 30S and is accommodated in the accommodation portion 31 of the moving body 30. The control when the energy storage device 40 moves up the slope 30S may be performed by the control command from the third energy management unit 32 of the moving body 30, or by the control command from the central information management server 60.

Since the energy storage device 40 can move in and out by self-propelling between the outside of the moving body 30 and the inside of the accommodation portion 31 of the moving body 30 using the slope 30S of the moving body 30, the energy storage device 40 can be moved from the outside of the moving body 30 to the inside of the accommodation portion 31 of the moving body 30 by self-propelling and can be moved from the inside of the accommodation portion 31 of the moving body 30 to the transport destination by self-propelling. Therefore, the work of loading the energy storage device 40 into the moving body 30 and unloading the energy storage device 40 from the moving body 30 to the transport destination after the moving body 30 arrives around the transport destination, which is performed manually in the related art, can be performed without human intervention.

When energy storage device 40 is accommodated in the accommodation portion 31 of the moving body 30, the energy storage device 40 does not transmit and receive information to and from the central information management server 60 via the communication device 61. In this case, the energy storage device 40 may transmit and receive information to and from the central information management server 60 via the third energy management unit 32 and the third information management terminal 36 of the moving body 30.

When the energy storage device 40 is accommodated in the accommodation portion 31 of the moving body 30, the radio wave of wireless communication may be blocked by the accommodation portion 31 of the moving body 30 and the communication state between the energy storage device 40 and the communication device 61 may deteriorate. Even in such a case, by transmitting and receiving information to and from the central information management server 60 via the third energy management unit 32 and the third information management terminal 36 of the moving body 30, the energy storage device 40 can reliably transmit and receive information to and from the central information management server 60.

The energy storage device 40 accommodated in the accommodation portion 31 of the moving body 30 receives power from the third energy management unit 32 and is charged as needed. The power supply from the third energy management unit 32 may be performed by a control command generated by the third energy management unit 32 or by a control command from the central information management server 60. Further, the energy storage device 40 accommodated in the accommodation portion 31 of the moving body 30 may be capable of supplying power from the third energy management unit 32 to the energy storage unit 34 of the moving body 30 as needed.

As a result, since the energy storage device 40 can transmit and receive energy to and from the energy storage unit 34 of the moving body 30, the energy stored in the energy storage device 40 and the energy stored in the energy storage unit 34 of the moving body 30 can be efficiently used.

The energy storage device 40 accommodated in the accommodation portion 31 of the moving body 30 moves inside the accommodation portion 31 of the moving body 30 by self-propelling and changes a position in the accommodation portion 31 of the moving body 30. A self-propelling control command inside the accommodation portion 31 of the moving body 30 to the energy storage device 40 may be a control command generated by the third energy management unit 32 or a control command from the central information management server 60.

As a result, the energy storage device 40 can be quickly arranged in the optimal position of the accommodation portion 31 of the moving body 30 without human intervention.

The energy storage device 40 accommodated in the accommodation portion 31 of the moving body 30 moves inside the accommodation portion 31 of the moving body 30 by self-propelling based on the state of the moving body 30 from the information acquired by the position information acquisition unit 361, the surrounding road information acquisition unit 362, the traveling state acquisition unit 363, the energy storage unit state acquisition unit 364, and the drive unit state acquisition unit 365 of the moving body 30 and the information stored in the information storage unit 366.

The energy storage device 40 accommodated in the accommodation portion 31 of the moving body 30 moves inside the accommodation portion 31 of the moving body 30 by self-propelling based on at least one of the velocity information and the acceleration information of the moving body 30 acquired by the traveling state acquisition unit 363 of the moving body 30. More specifically, at least one of the velocity information and the acceleration information of the moving body 30 acquired by the traveling state acquisition unit 363 of the moving body 30 is transmitted from the wireless communication unit 368 of the third information management terminal 36. The energy storage device 40 accommodated in the accommodation portion 31 of the moving body 30 receives at least one of the velocity information and the acceleration information of the moving body 30 transmitted from the wireless communication unit 368 through the wireless communication unit 45. Then, the energy storage device 40 accommodated in the accommodation portion 31 of the moving body 30 acquires the traveling state of the moving body 30 based on at least one of the velocity information and the acceleration information of the moving body 30 received by the wireless communication unit 45. Then, the energy storage device 40 accommodated in the accommodation portion 31 of the moving body 30 moves inside the accommodation portion 31 of the moving body 30 by self-propelling based on the acquired traveling state of the moving body 30. Communication between the wireless communication unit 368 of the moving body 30 and the wireless communication unit 45 of the energy storage device 40 may be performed directly or via the central information management server 60 and the communication device 61.

In the embodiment, the energy storage device 40 accommodated in the accommodation portion 31 of the moving body 30 moves inside the accommodation portion 31 of the moving body 30 by self-propelling when at least one of the velocity and the acceleration of the moving body 30 is less than or equal to a predetermined value.

This allows the energy storage device 40 to move inside the accommodation portion 31 of the moving body 30 by self-propelling in a safe state with a simple configuration.

The energy storage device 40 accommodated in the accommodation portion 31 of the moving body 30 moves inside the accommodation portion 31 of the moving body 30 by self-propelling based on the movement environment of the moving body 30 acquired by the surrounding road information acquisition unit 362 of the moving body 30.

In the embodiment, the energy storage device 40 accommodated in the accommodation portion 31 of the moving body 30 moves inside the accommodation portion 31 of the moving body 30 by self-propelling based on the traffic information around the moving body 30, for example, the signal indication ahead.

For example, the energy storage device 40 accommodated in the accommodation portion 31 of the moving body 30 moves inside the accommodation portion 31 of the moving body 30 by self-propelling when the traffic light in front of the moving body 30 is a red light.

This allows the energy storage device 40 to move inside the accommodation portion 31 of the moving body 30 by self-propelling in a safe state with a simple configuration.

For example, as illustrated in FIGS. 4A, 4B and 4C, the third energy management unit 32 is arranged inside the accommodation portion 31 of the moving body 30 and the accommodation portion 31 includes an energy transmission and reception area 31A where the energy storage device 40 can transmit and receive energy to and from the energy storage unit 34 of the moving body 30 via the third energy management unit 32.

When, as illustrated in FIG. 4A, the energy storage device 40 arranged in the energy transmission and reception area 31A of accommodation portion 31 transmits and receives energy to and from the energy storage unit 34 of the moving body 30, and then the energy storage device 40 becomes fully charged, for example, and the energy transmission and reception is completed, as illustrated in FIG. 4B, the energy storage device 40 arranged in the energy transmission and reception area 31A moves out of the area of the energy transmission and reception area 31A by self-propelling. Then, the energy storage device 40, which needs to be supplied with energy from the energy storage unit 34 of the moving body 30, moves into the area of the energy transmission and reception area 31A by self-propelling.

Therefore, even when a plurality of energy storage devices 40 are accommodated in the accommodation portion 31 of the moving body 30, and the plurality of energy storage devices 40 need to transmit and receive energy to and from the energy storage unit 34 of the moving body 30, energy can be efficiently transferred between the energy storage devices 40 and the energy storage unit 34 of the moving body 30 without human intervention.

In the embodiment, the energy transferred between the energy storage device 40 and the energy storage unit 34 of the moving body 30 is electric power and the electric power is transferred between the energy storage device 40 and the energy storage unit 34 of the moving body 30 by charging and discharging via the third energy management unit 32. Further, the charge and discharge between the energy storage device 40 and the third energy management unit 32 may be a contact type, a non-contact type, or a combination of the contact type and the non-contact type.

The energy storage device 40 can also be charged and discharged with another energy storage device 40. A charge and discharge control command between the energy storage devices 40 may be a control command generated by the third energy management unit 32 of the moving body 30 or a control command generated by the central information management server 60.

As a result, the energy stored in the plurality of energy storage devices 40 accommodated in the accommodation portion 31 of the moving body 30 can be stored in each energy storage device 40 with the optimal distribution.

As illustrated in FIGS. 4B and 4C, the energy storage device 40 changes a position inside the accommodation portion 31 of the moving body 30 by self-propelling based on the transport destination information of the transported object 70 acquired by the transported object information acquisition unit 446.

In the embodiment, when it is determined that the moving body 30 approaches the transport destination of the transported object 70 within a predetermined distance based on the position information of the moving body 30 acquired by the position information acquisition unit 361 of the third information management terminal 36 of the moving body 30 and the transport destination information of the transported object 70 acquired by the transported object information acquisition unit 446 of the energy storage device 40, the energy storage device 40 moves near the slope 30S of the accommodation portion 31 by self-propelling.

The charge and discharge control command between the energy storage devices 40 may be a control command generated by the third energy management unit 32 of the moving body 30 or a control command generated by the central information management server 60.

As a result, when the moving body 30 approaches the transport destination of the transported object 70, the energy storage device 40 can be moved to a position where it is easy to move to the outside of the accommodation portion 31 of the moving object 30, and thus the transported object can be moved efficiently from accommodation portion 31 of the moving body 30.

Then, when the moving body 30 arrives near the second station 20 and it is detected that the slope 30S of the moving body 30 is hung on the ground, the energy storage device 40 exits to the outside of the accommodation portion 31 of the moving body 30 from the slope 30S and moves to the second station 20 by self-propelling In this way, the transported object 70 loaded on the energy storage device 40 is transported to the second station 20. The energy storage device 40 for which the transport of the transported object 70 is completed returns to the accommodation portion 31 of the moving body 30 by self-propelling and is again accommodated in the accommodation portion 31 of the moving body 30.

In addition, the energy storage device 40 changes the position in the accommodation portion 31 of the moving body 30 by self-propelling based on the contents of the transported object 70 to be loaded.

As a result, the movement of the energy storage device 40 inside the accommodation portion 31 of the moving body 30 can be adjusted according to the contents of the transported object 70 loaded on the energy storage device 40.

In the embodiment, based on the goods information of the transported object 70 acquired by the transported object information acquisition unit 446, when the transported object 70 is an item which requires careful handling such as a fragile item, the energy storage device 40 does not change the position in the accommodation portion 31 of the moving body 30 and prohibits self-propelled movement. As a result, the transported object 70 can be transported to the transport destination more safely.

As for a moving path of the moving body 30 and each energy storage device 40, it is necessary to find an efficient moving path by determining the traffic conditions such as traffic jams, road disruption at the time of disaster, and the situation of bad weather. However, information may be aggregated on the central information management server 60 to control movement. Further, the central information management server 60 may control the movement of the moving body 30 and each energy storage device 40 by predicting the energy demand from social information such as weather, natural disasters, traffic information, distribution information of people, energy supply and demand information, and distribution status. For example, the supply amount of renewable energy may be predicted from the weather information, and the movement of the moving body 30 and each energy storage device 40 may be controlled based on the predicted supply amount of renewable energy. This makes it possible to transport the energy storage device 40 in the optimal operation, that is, to transport the required item to the required place and at the required timing from the viewpoint of energy and time.

Fixing Mechanism for Energy Storage Device

Figure 5A:
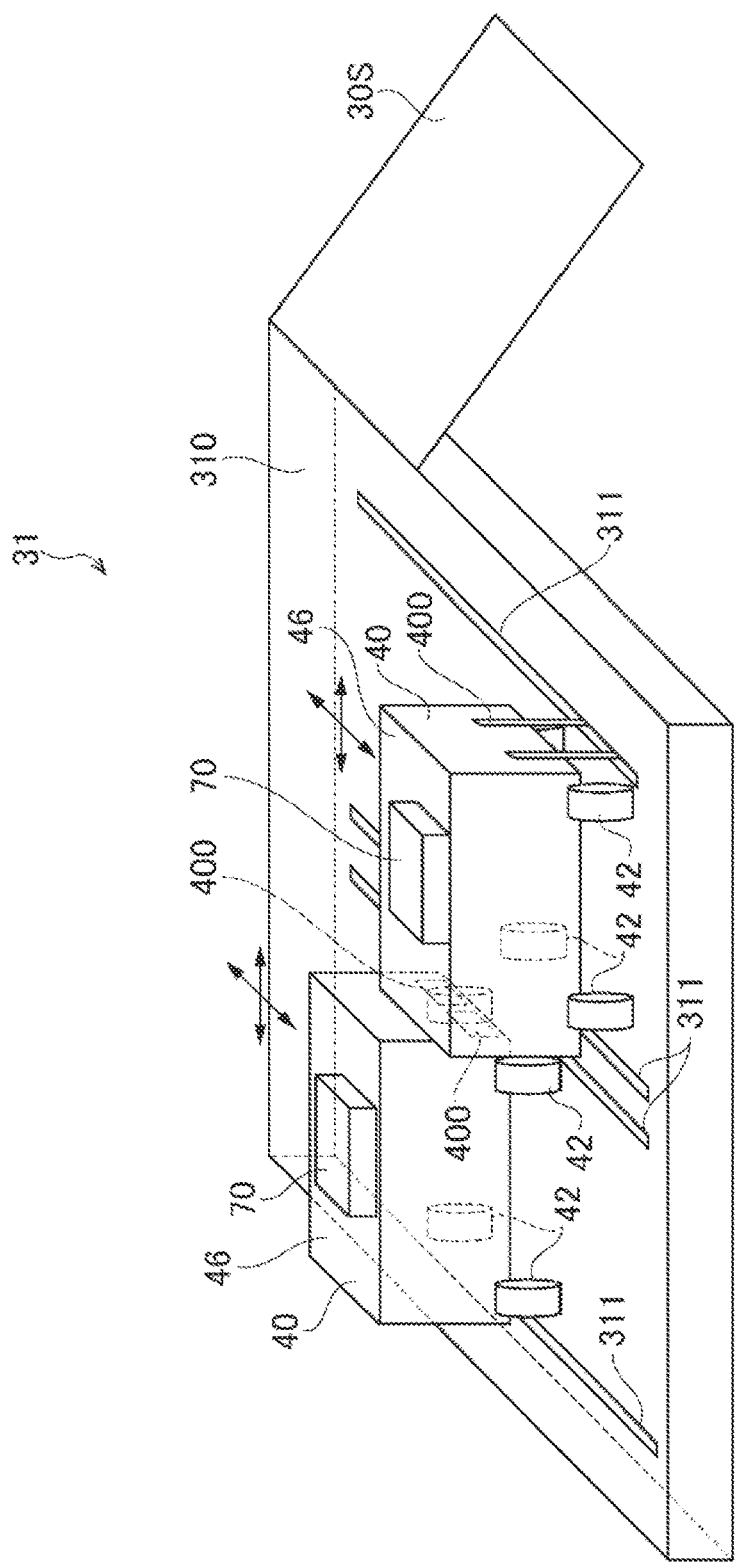
FIG. 5A is a view illustrating an example of a mechanism for fixing the energy storage device of FIG. 1 to the accommodation portion of the moving body.

As illustrated in FIG. 5A, a fixing member 400 having a claw portion 401 which can project downward from a side surface is provided on the side surface of the energy storage device 40. A slit groove 311 is formed in the floor 310 of the accommodation portion 31 of the moving body 30.

As illustrated in FIG. 5B, the fixing member 400 has a rotation axis 400A in a direction perpendicular to the side surface of the energy storage device 40 to which the fixing member 400 is attached. The fixing member 400 is attached to the side surface of the energy storage device 40 so that the claw portion 401 pivots on the rotation axis 400A.

The fixing member 400 pivots so that the claw portion 401 rises when the energy storage device 40 moves by self-propelling, so that the claw portion 401 is located above a lower end of the wheel 42 of the energy storage device 40. Then, when the energy storage device 40 is stopped inside the accommodation portion 31 of the moving body 30, the claw portion 401 pivots so as to be lowered and the claw portion 401 is arranged in the slit groove 311 of the accommodation portion 31 of the moving body 30. Further, the claw portion 401 moves away from the side surface to which the fixing member 400 of the energy storage device 40 is attached and is engaged with the slit groove 311. Then, the energy storage device 40 is fixed to the floor 310 of the accommodation portion 31 of the moving body 30 by engaging the claw portion 401 of the fixing member 400 with the slit groove 311. Then, when the claw portion 401 moves so as to approach the side surface to which the fixing member 400 of the energy storage device 40 is attached, the claw portion 401 is disengaged from the slit groove 311. In this way, the claw portion 401 of the fixing member 400 of the energy storage device 40 can be engaged with and disengaged from the slit groove 311 of the accommodation portion 31 of the moving body 30.

As a result, the energy storage device 40 can be quickly engaged and disengaged and firmly fixed to the accommodation portion 31 of the moving body 30 without human intervention. Further, when the energy storage device 40 moves by self-propelling, the claw portion 401 pivots so as to rise and the claw portion 401 is located above the lower end of the wheel 42 of the energy storage device 40. Therefore, the fixing member 400 can be prevented from interfering with the movement of the energy storage device 40.

A width of the slit groove 311 is sufficiently narrower than the wheel 42 of the energy storage device 40 so that the wheel 42 of the energy storage device 40 does not fall into the slit groove 311.

In the embodiment, an engagement sensor 311A is provided in the slit groove 311 of the accommodation portion 31 of the moving body 30. The engagement sensor 311A is a sensor which detects whether the energy storage device 40 is engaged with the slit groove 311 and is, for example, a pressure sensor. Further, the engagement sensor 311A transmits information on whether the energy storage device 40 is engaged with the slit groove 311 to the third information management terminal of the moving body 30. As a result, the moving body 30 and the central information management server 60 can acquire information on whether the energy storage device 40 is engaged with the slit groove 311.

In the embodiment, the engagement sensor 311A is provided in the slit groove 311 of the accommodation portion 31 of the moving body 30, but it may be provided in the fixing member 400 of the energy storage device 40. Also, the engagement sensor 311A may be provided in both the slit groove 311 of the accommodation portion 31 of the moving body 30 and the fixing member 400 of the energy storage device 40.

Figure 6A:
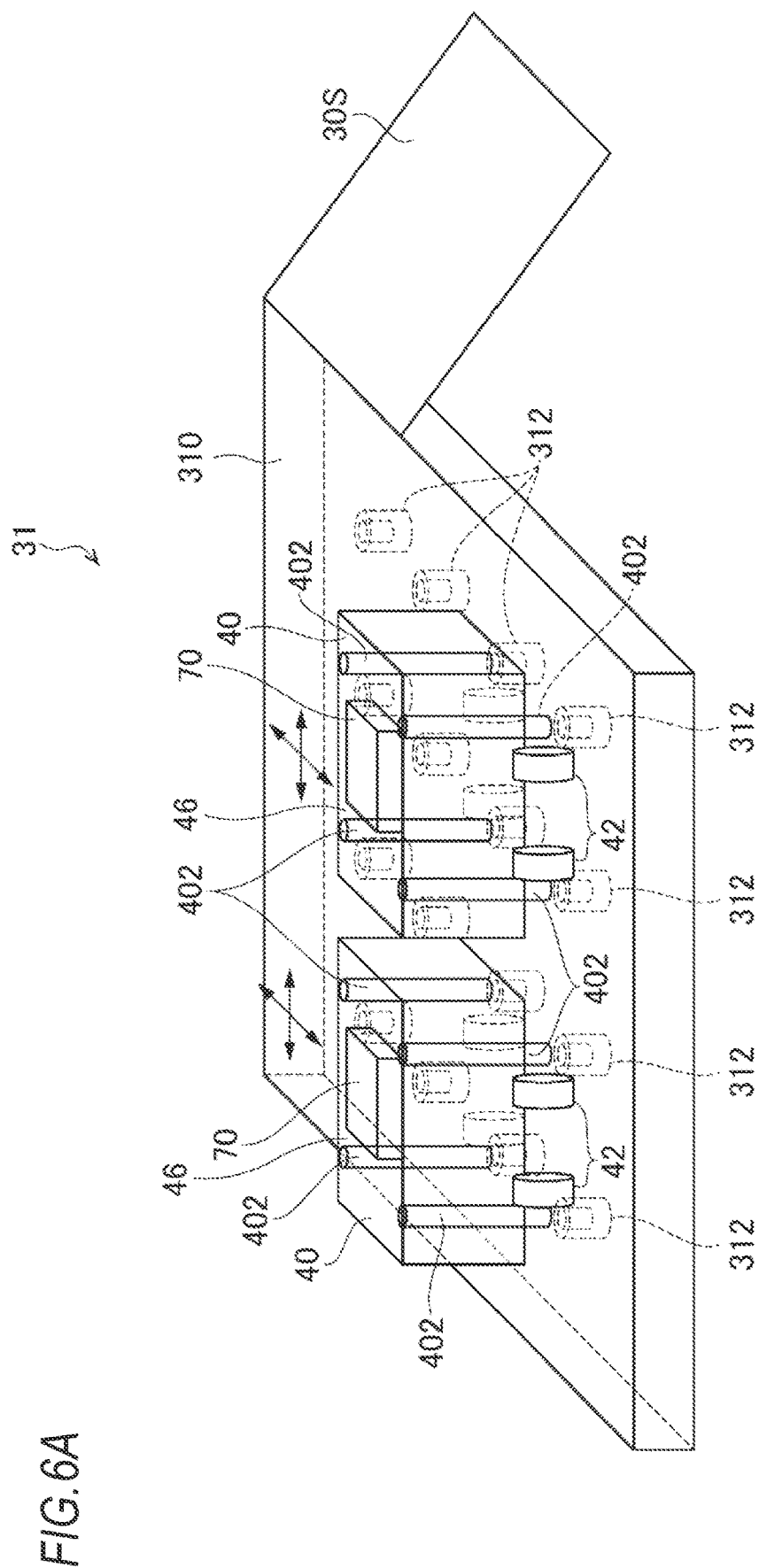
FIG. 6A is a view illustrating an example of the mechanism for fixing the energy storage device of FIG. 1 to the accommodation portion of the moving body.
Figure 6B:
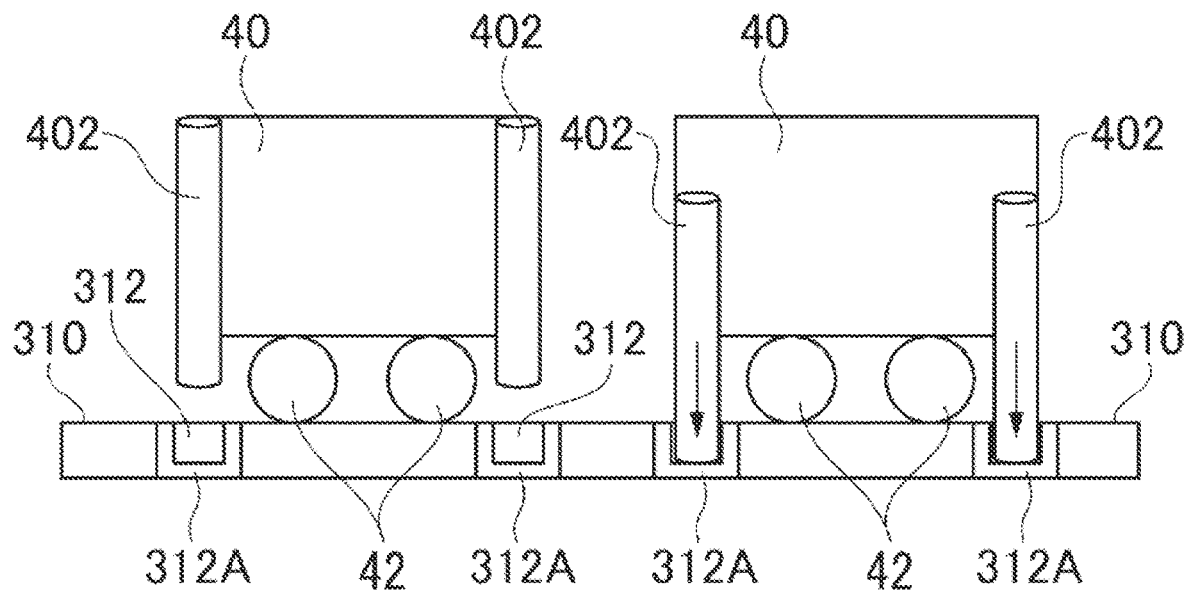
FIG. 6B is a view illustrating details of the fixing mechanism of FIG. 6A.
Figure 6C:
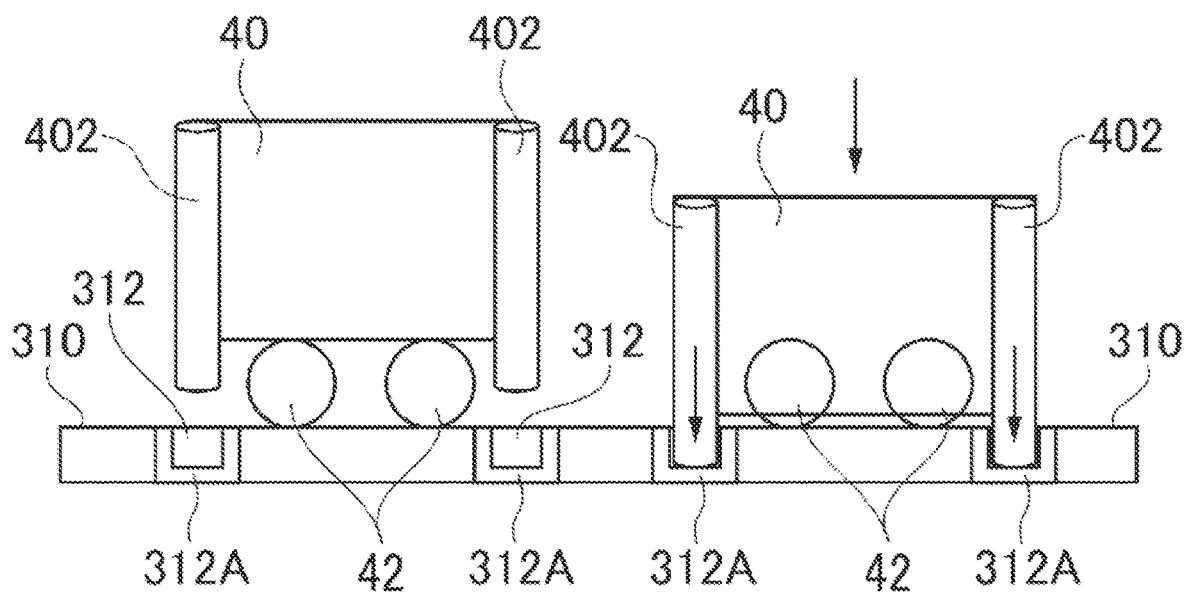
FIG. 6C is a view illustrating a modification example of the fixing mechanism of FIG. 6B.

As illustrated in FIGS. 6A to 6C, disengageable fixation of the energy storage device 40 to the accommodation portion 31 of the moving body 30 may be performed by a lock pin 402 provided in the energy storage device 40 and a lock hole 312 provided in the floor 310 of the accommodation portion 31 of the moving body 30.

As illustrated in FIG. 6A, the energy storage device 40 includes the lock pin 402 which projects toward the floor 310 of the accommodation portion 31 of the moving body 30. The floor 310 of the accommodation portion 31 of the moving body 30 is provided with the lock hole 312 into which the lock pin 402 can be inserted.

As illustrated in FIG. 6B, the lock pin 402 can be moved up and down with respect to the energy storage device 40. When the energy storage device 40 moves by self-propelling, the lock pin 402 is raised so as to be located above the lower end of the wheel 42 of the energy storage device 40. Then, when the energy storage device 40 is stopped inside the accommodation portion 31 of the moving body 30, the lock pin 402 is lowered and inserted into the lock hole 312 of the accommodation portion 31 of the moving body 30, and then is engaged with the lock hole 312. Then, the energy storage device 40 is fixed to the floor 310 of the accommodation portion 31 of the moving body 30 by engaging the lock pin 402 with the lock hole 312. Then, when the lock pin 402 rises, the engagement with the lock hole 312 is disengaged. In this way, the lock pin 402 of the energy storage device 40 can be engaged with and disengaged from the lock hole 312 of the accommodation portion 31 of the moving body 30.

As illustrated in FIG. 6C, the entire energy storage device 40 may be movable up and down except for the wheel 42. When the energy storage device 40 moves by self-propelling, the energy storage device 40 is raised as a whole except for the wheel 42 and the lock pin 402 is located above the lower end of the wheel 42 of the energy storage device 40. Then, when the energy storage device 40 is stopped inside the accommodation portion 31 of the moving body 30, the entire energy storage device 40 is lowered except for the wheel 42 and the lock pin 402 is inserted into the lock hole 312 of the accommodation portion 31 of the moving body 30 and is engaged with the lock hole 312. Then, the energy storage device 40 is fixed to the floor 310 of the accommodation portion 31 of the moving body 30 by engaging the lock pin 402 with the lock hole 312. Then, when the energy storage device 40 rises as a whole except for the wheel 42, the engagement with the lock hole 312 is disengaged. In this way, the lock pin 402 of the energy storage device 40 may be disengageable from the lock hole 312 of the accommodation portion 31 of the moving body 30.

As a result, the energy storage device 40 can be quickly engaged and disengaged and firmly fixed to the accommodation portion 31 of the moving body 30 without human intervention. In addition, when the energy storage device 40 moves by self-propelling, the lock pin 402 is located above the lower end of the wheel of the energy storage device 40. Therefore, the lock pin 402 can be prevented from interfering with the movement of the energy storage device 40.

In addition, an engagement sensor 312A is provided in the lock hole 312 of the accommodation portion 31 of the moving body 30. The engagement sensor 312A is a sensor which detects whether the energy storage device 40 is inserted into the lock hole 312 and is, for example, a pressure sensor. In addition, the engagement sensor 312A transmits information on whether the energy storage device 40 is engaged with the lock hole 312 to the third information management terminal of the moving body 30. As a result, the moving body 30 and the central information management server 60 can acquire information on whether the energy storage device 40 is engaged with the lock hole 312.

In the embodiment, it is assumed that the engagement sensor 312A is provided in the lock hole 312 of the accommodation portion 31 of the moving body 30, but may be provided in the lock pin 402 of the energy storage device 40. Also, the engagement sensor 312A may be provided in both the lock hole 312 of the accommodation portion 31 of the moving body 30 and the lock pin 402 of the energy storage device 40.

Second Embodiment

Figure 7:
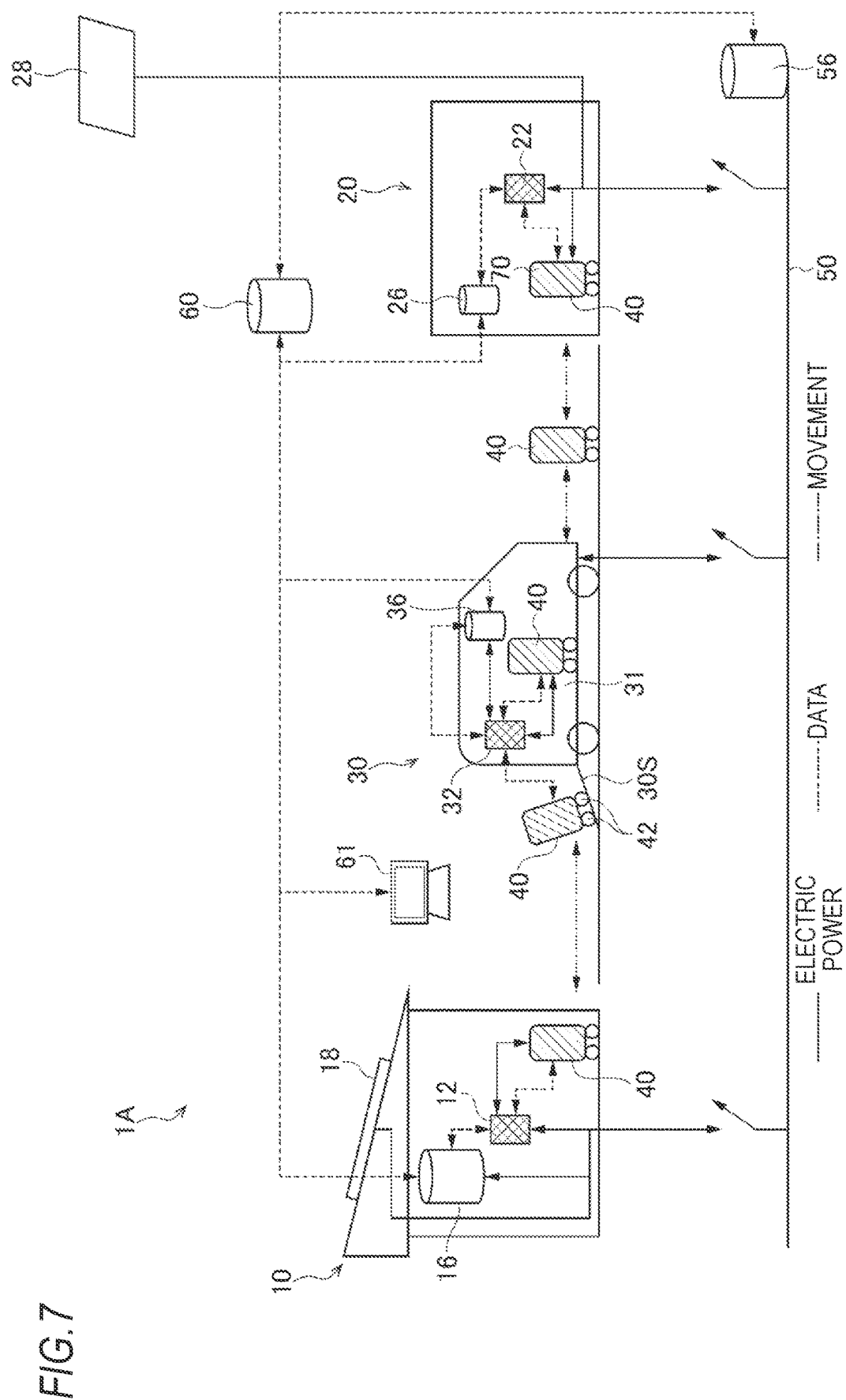
FIG. 7 is a schematic view of an energy storage device transport system according to a second embodiment of the invention.

Subsequently, an energy storage device transport system 1A according to a second embodiment of the invention will be described with reference to FIG. 7. In the following description, the same components as those of the energy storage device transport system 1 of the first embodiment are designated by the same numerals and letters and the description thereof is omitted or simplified. In the energy storage device transport system 1 of the first embodiment, it is assumed that the energy storage device 40 is loaded with the transported object 70 such as luggage. However, in the energy storage device transport system 1A of the second embodiment, the energy storage device 40 is not loaded with the transported object 70. In the energy storage device transport system 1A of the second embodiment, the energy stored in the energy storage unit 41 of the energy storage device 40 is transported to the second station 20, which is the transport destination. That is, the transported object transported by the energy storage device transport system 1 of the first embodiment to the second station 20 is the transported object 70 such as luggage and the transported object transported by the energy storage device transport system 1A of the second embodiment to the second station 20 is energy. In the energy storage device transport system 1 of the first embodiment, the transported object 70 transported to the second station 20 may be an energy source. Hereinafter, differences between the energy storage device transport system 1 of the first embodiment and the energy storage device transport system 1A of the second embodiment will be described in detail.

The energy storage device transport system 1A of the second embodiment can transport the energy to the second station 20 by transporting the energy storage device 40 in which the energy is stored in the energy storage unit 41 to the second station 20.

The energy storage device 40 is equipped with a connection terminal such as an outlet plug of the related art. Therefore, by connecting an electronic device or the like to the connection terminal, the energy storage device 40 can operate the electronic device or the like by using the energy stored in the energy storage unit 41 of the energy storage device 40. Then, the energy stored in the energy storage unit 41 of the energy storage device 40 is used around the second station 20.

The energy stored in the energy storage unit 41 of the energy storage device 40 around the second station 20, which is the transport destination of the energy storage device 40, is expected to be used in various ways. That is, the energy storage unit 41 of the energy storage device 40 is required to have various output characteristics. In response to such demands, it is difficult to increase the C rate in Li-ion batteries of the related art because the diffusion rate of solvated ions is limited. On the other hand, it is possible to handle even higher C rates because all-solid-state batteries are less susceptible to the restrictions of solvated ion diffusion. In addition, since the all-solid-state battery does not have an electrolyte, the growth of the SEI layer, which is considered to be derived from the electrolytic solution and is the main cause of the deterioration of the Li-ion battery, is suppressed, so that the deterioration is small.

Further, the energy storage unit 41 of the energy storage device 40 of the embodiment may be used repeatedly or may be stored at a high potential for a long time. Therefore, using an all-solid-state battery for the energy storage unit 41 of the energy storage device 40 reduces the frequency of replacement due to deterioration, which is advantageous in terms of cost.

Therefore, the energy storage unit 41 of the energy storage device 40 in the energy storage device transport system 1A of the embodiment is preferably an all-solid-state battery.

The second energy management unit 22 of the second station 20 transmits an energy demand amount around the second station 20 to the central information management server 60. The central information management server 60 transmits a remaining required energy amount of the energy storage unit 41 of the energy storage device 40 to be transported, to the second station 20 to the third energy management unit 32 of the moving body 30 based on the energy demand amount around the second station 20. The energy demand amount transmitted by the second energy management unit 22 of the second station 20 to the central information management server 60 may be the predicted energy demand amount calculated by using, for example, a mechanical learning method, an artificial intelligence method, or the like.

Then, based on the remaining required energy amount of the energy storage unit 41 of the energy storage device 40 to be transported to the second station 20, which is transmitted to the third energy management unit 32, and the remaining energy state (SOC) of the energy storage unit 41 of each energy storage device 40, which is acquired by the energy storage unit state acquisition units 444 of a plurality of energy storage devices 40 accommodated in the accommodation portion 31 of the moving body 30, each energy storage device 40 changes a position inside the accommodation portion 31 of the moving body 30 by self-propelling.

In the embodiment, based on the remaining required energy amount of the energy storage unit 41 of the energy storage device 40 to be transported to the second station 20, the energy storage device 40 with the optimal remaining energy state (SOC) of the energy storage unit 41 moves to the vicinity of the slope 30S of the accommodation portion 31 by self-propelling.

Therefore, for example, when the energy demand amount around the second station 20 is high and the moving body 30 approaches the second station 20, the energy storage device 40 in which the remaining energy state (SOC) of the energy storage unit 41 is fully charged can be moved to a position where it is easy to move to the outside of the accommodation portion 31 of the moving body 30.

In this way, when the moving body 30 approaches the second station 20, the optimal energy storage device 40 moves to a position where it is easy to move to the outside of the accommodation portion 31 of the moving body 30. Therefore, inside the accommodation portion 31 of the moving body 30, the energy storage device 40 can be optimally arranged according to the energy demand amount at the second station 20 and the remaining amount of energy stored in the energy storage unit 41.

A self-propelling control command to the energy storage device 40 inside the accommodation portion 31 of the moving body 30 may be a control command generated by the third energy management unit 32, or may be a control command from the central information management server 60.

Although the embodiments of the invention are described above, the invention is not limited to the embodiments described above and can be appropriately modified, improved, and the like.

For example, the energy storage device 40 may perform the life diagnosis of the energy storage unit 41 by acquiring the deterioration information and the usage history of the energy storage unit 41 with the energy storage unit state acquisition unit 444. Then, when the energy storage unit 41 needs to be replaced, the energy storage device 40 may transmit information to the central information management server 60 that the energy storage unit 41 needs to be replaced and the central information management server 60 may control the movement of the moving body 30 and each energy storage device 40 so as to transport the energy storage device 40 to a recycling center. This will reduce the cost and man-hours required to replace the energy storage unit 41.

Further, for example, the central information management server 60 may be managed by blockchain technology. In addition, the central information management server 60 may optimize the overall energy and/or logistics system of the energy storage device transport system 1 and 1A each of which includes the first station 10, the second station 20, the moving body 30, each energy storage device 40, and the system power grid 50 using mechanical learning methods and artificial intelligence methods and may control the movement of the moving body 30 and each energy storage device 40.

Further, in the first embodiment and the second embodiment, it is assumed that the moving body 30 is moved by unmanned operation in which the drive unit 33 is driven by the electric power output from the control output unit 367 of the third information management terminal 36, but the moving body 30 may be moved by manned operation.

Further, in the first embodiment and the second embodiment, the energy storage device 40 accommodated in the accommodation portion 31 of the moving body 30 is self-propelled inside the accommodation portion 31 of the moving body 30 based on the information of the traveling state which is at least one of the velocity and the acceleration of the moving body 30 acquired by the traveling state acquisition unit 363 of the moving body 30. However, the energy storage device 40 may acquire the traveling state of the moving body 30 based on an operating state such as whether the moving body 30 is turned on, not limited to at least one of the velocity and the acceleration of the moving body 30 acquired by the traveling state acquisition unit 363 of the moving body 30 and may be self-propelled inside the accommodation portion 31 of the moving body 30.

Further, in the first embodiment and the second embodiment, the energy storage device 40 accommodated in the accommodation portion 31 of the moving body 30 acquires the traveling state of the moving body 30 from the information of at least one of the velocity and the acceleration of the moving body 30 received by the wireless communication unit 45 and is self-propelled inside the accommodation portion 31 of the moving body 30 based on the acquired traveling state of the moving body 30. However, the energy storage device 40 accommodated in the accommodation portion 31 of the moving body 30 may acquire the traveling state of the moving body 30 from the information of at least one of the velocity and the acceleration detected by the traveling state acquisition unit 443 and may be self-propelled inside the accommodation portion 31 of the moving body 30 based on the acquired traveling state of the moving body 30. In this case, the energy storage device 40 can be self-propelled inside the accommodation portion 31 of the moving body 30 based on the information of at least one of the estimated velocity and acceleration of the moving body 30 without acquiring the information of at least one of the velocity and the acceleration of the moving body 30 from the moving body 30.

Further, in the first embodiment and the second embodiment, the information of at least one of the velocity and the acceleration of the moving body 30 acquired by the traveling state acquisition unit 363 of the moving body 30 is transmitted from the wireless communication unit 368 of the third information management terminal 36 and the energy storage device 40 accommodated in the accommodation portion 31 of the moving body 30 acquires the traveling state of the moving body 30. However, the moving body 30 may acquire the traveling state of the moving body 30 and generate a control signal of the energy storage device 40 accommodated in the accommodation portion 31 based on the acquired traveling state of the moving body 30. Then, the control signal of the energy storage device 40 may be transmitted from the wireless communication unit 368 of the moving body 30 and the energy storage device 40 accommodated in the accommodation portion 31 of the moving body 30 may receive the control signal of the energy storage device 40 with the wireless communication unit 45 and be self-propelled inside the accommodation portion 31 of the moving body 30 by the received control signal of the energy storage device 40.

Further, the energy storage device 40 may have a plurality of energy storage units 41. Some energy storage units 41 may be fixed to the energy storage device 40. In addition, some energy storage units 41 are detachably provided in the energy storage device 40 and may be loaded and unloaded with respect to the energy storage device 40.

Then, at least one of the transport source and transport destination of the energy storage device 40, the energy storage device 40 may unload the energy storage unit 41 from the energy storage device 40 or load the energy storage unit 41 on the energy storage device 40.

In addition, the transportation of the energy storage device 40 described in the first embodiment and the second embodiment may be executed by a moving body transport program including an acquisition step of acquiring at least one of the moving state and the operating state of the moving body 30 recorded on a recording medium and a repositioning step of repositioning the energy storage device 40 in the accommodation portion 31 by making the energy storage device 40 self-propel inside the accommodation portion 31 based on at least one of the moving state and the operating state of the moving body 30 acquired in the acquisition step.

In addition, at least the following matters are described in this specification. The components and the like corresponding to those of the embodiments described above are shown in parentheses, but the invention is not limited to these.

(A1) A transport system (energy storage device transport system 1, 1A) which includes a first moving body (energy storage device 40) which can move autonomously and a second moving body (moving body 30) which has an accommodation portion (accommodation portion 31) for accommodating the first moving body and in which the second moving body accommodates the first moving body and moves to transport the first moving body, where
the first moving body autonomously moves inside the accommodation portion of the second moving body and changes a position in the accommodation portion of the second moving body.

According to (A1), the first moving body autonomously moves inside the accommodation portion of the second moving body and changes the position in the accommodation portion of the second moving body. Therefore, the first moving body can be quickly arranged and fixed in the optimal position in the accommodation portion of the second moving body without human intervention.

(A2) The transport system according to (A1), where
the first moving body changes the position by autonomously moving inside the accommodation portion of the second moving body based on at least one of a moving state and an operating state of the second moving body.

According to (A2), the first moving body changes the position by autonomously moving inside the accommodation portion of the second moving body based on the moving state and the operating state of the second moving body. Therefore, the first moving body can change the position by autonomously moving inside the accommodation portion of the second moving body in a safe state.

(A3) The transport system according to (A2), where
the moving state of the second moving body is at least one of velocity and acceleration of the second moving body.

According to (A3), since the moving state of the second moving body is at least one of the velocity and the acceleration of the second moving body, the first moving body can change the position by autonomously moving inside the accommodation portion of the second moving body based on at least one of the velocity and the acceleration of the second moving body. As a result, the first moving body can change the position by autonomously moving inside the accommodation portion of the second moving body in a safe state with a simple configuration.

(A4) The transport system according to (A3), where
the first moving body changes the position by autonomously moving inside the accommodation portion of the second moving body when at least one of the velocity and the acceleration of the second moving body is equal to or less than a predetermined value.

According to (A4), the first moving body changes the position by autonomously moving inside the accommodation portion of the second moving body when at least one of the velocity and the acceleration of the second moving body is equal to or less than the predetermined value. Therefore, the first moving body can change the position by autonomously moving inside the accommodation portion of the second moving body in a safer state.

(A5) The transport system according to any one of (A1) to (A4), where
the first moving body changes the position by autonomously moving inside the accommodation portion of the second moving body based on a movement environment around the second moving body.

According to (A5), the first moving body changes the position by autonomously moving inside the accommodation portion of the second moving body based on the movement environment around the second moving body. Therefore, the first moving body can change the position by autonomously moving inside the accommodation portion of the second moving body in a safe state.

(A6) The transport system according to (A5), where
the movement environment around the second moving body is at least one of traffic information around the second moving body and moving infrastructure information around the second moving body.

According to (A6), the movement environment around the second moving body is at least one of the traffic information around the second moving body and the moving infrastructure information around the second moving body. Therefore, the first moving body can change the position by autonomously moving inside the accommodation portion of the second moving body based on at least one of the traffic information around the second moving body and the moving infrastructure information around the second moving body. As a result, the first moving body can change the position by autonomously moving inside the accommodation portion of the second moving body in a safe state with a simple configuration.

(A7) The transport system according to any one of (A1) to (A6), where
the first moving body,
includes a first energy storage unit (energy storage unit 41) and transports energy stored in the first energy storage unit from a transport source to a transport destination, and
at least one of the transport source and the transport destination, the first moving body,
outputs the energy stored in the first energy storage unit to the outside,
inputs external energy to the first energy storage unit,
unloads the first energy storage unit from the first moving body, or
loads the first energy storage unit on the first moving body.

According to (A7), the first moving body includes the first energy storage unit and can transport the energy stored in the first energy storage unit from the transport source to the transport destination. Further, at least one of the transport source and the transport destination, the first moving body can output the energy stored in the first energy storage unit to the outside, input external energy to the first energy storage unit, unload the first energy storage unit from the first moving body, or load the first energy storage unit on the first moving body.

(A8) The transport system according to (A7), where
the first moving body changes the position by autonomously moving inside the accommodation portion of the second moving body based on a remaining amount of energy stored in the first energy storage unit.

According to (A8), the first moving body changes the position by autonomously moving inside the accommodation portion of the second moving body based on the remaining amount of energy stored in the first energy storage unit. Therefore, inside the accommodation portion of the second moving body, the first moving body can be optimally arranged according to the remaining amount of energy stored in the first energy storage unit.

(A9) The transport system according to (A7) or (A8), where
the first moving body changes the position by autonomously moving inside the accommodation portion of the second moving body based on an energy demand amount of the transport destination.

According to (A9), the first moving body changes the position by autonomously moving inside the accommodation portion of the second moving body based on the energy demand amount of the transport destination. Therefore, inside the accommodation portion of the second moving body, the first moving body can be optimally arranged according to the energy demand amount of the transport destination.

(A10) The transport system according to any one of (A7) to (A9), where
the second moving body includes a second energy storage unit (energy storage unit 34), and
the first energy storage unit of the first moving body and the second energy storage unit of the second moving body are provided so that energy can be transmitted and received to and from each other.

According to (A10), the first energy storage unit of the first moving body and the second energy storage unit of the second moving body are provided so that energy can be transmitted and received to and from each other. Therefore, the energy stored in the first energy storage unit of the first moving body and the energy stored in the second energy storage unit of the second moving body can be efficiently used.

(A11) The transport system according to (A10), where
the accommodation portion of the second moving body has an energy transmission and reception area (energy transmission and reception area 31A) where the first energy storage unit and the second energy storage unit transmit and receive energy to and from each other, and
the first moving body autonomously moves inside the accommodation portion of the second moving body and changes the position so that the position is within the energy transmission and reception area when the first energy storage unit and the second energy storage unit transmit and receive energy to and from each other.

According to (A11), the first moving body autonomously moves inside the accommodation portion of the second moving body and changes the position so that the position is within the energy transmission and reception area when the first energy storage unit and the second energy storage unit transmit and receive energy to and from each other. Therefore, even when the transport system includes a plurality of first moving bodies, energy can be efficiently transferred between the first energy storage unit of the first moving body and the second energy storage unit of the second moving body without human intervention.

(A12) The transport system according to any one of (A7) to (A11), where
 the accommodation portion of the second moving body is provided so as to be able to accommodate a plurality of the first moving bodies, and
 the first energy storage unit of the first moving body is provided so as to be able to transmit and receive energy to and from the first energy storage unit of a different first moving body.

According to (A12), the accommodation portion of the second moving body is provided so as to be able to accommodate a plurality of the first moving bodies and the first energy storage unit of the first moving body is provided so as to be able to transmit and receive energy to and from the first energy storage unit of a different first moving body. Therefore, the energy stored in the first energy storage units of the plurality of first moving bodies accommodated in the accommodation portion of the second moving body can be stored in the first energy storage units of each of the first moving bodies with the optimal distribution.

(A13) The transport system according to any one of (A1) to (A12), where
 the first moving body includes a loading unit (loading unit 46) which loads a transported object (transported object 70).

According to (A13), the first moving body includes the loading unit which loads the transported object. Therefore, the first moving body can load the transported object such as luggage on the loading unit and transport the transported object from the transport source to the transport destination.

(A14) The transport system according to (A13), where
 the first moving body changes the position by autonomously moving inside the accommodation portion of the second moving body based on transport destination information of the transported object.

According to (A14), the first moving body changes the position by autonomously moving inside the accommodation portion of the second moving body based on the transport destination information of the transported object. Therefore, w % ben the moving body approaches the transport destination of the transported object, the first moving body can be moved to a position where it is easy to move to the outside of the accommodation portion of the second moving body and the transported object can be efficiently moved from the accommodation portion of the second moving body.

(A15) The transport system according to (A13) or (A14), where
 the first moving body changes the position by autonomously moving inside the accommodation portion of the second moving body based on content information of the transported object.

According to (A15), the first moving body changes the position by autonomously moving inside the accommodation portion of the second moving body based on the content information of the transported object. Therefore, for example, when the transported object article loaded on the loading unit is a fragile item, the movement of the first moving body inside the accommodation portion of the second moving body can be adjusted according to the contents of the transported object loaded on the loading unit, such as not moving autonomously and changing the position in the accommodation portion of the second moving body.

(A16) The transport system according to any one of (A1) to (A15), where
 the second moving body includes an auxiliary portion (slope 30S) which allows the first moving body to be able to autonomously move between the inside and the outside of the accommodation portion.

According to (A16), the second moving body includes the auxiliary portion which allows the first moving body to be able to autonomously move between the inside and the outside of the accommodation portion. Therefore, the first moving body can be moved from the outside of the second moving body to the inside of the accommodation portion of the second moving body by autonomous movement. Also, the first moving body can be moved from the inside of the accommodation portion of the second moving body to the transport destination by autonomous movement. Therefore, the work of loading the first moving body into the second moving body and unloading the first moving body from the second moving body to the transport destination after the second moving body arrives around the transport destination, which is performed manually in the related art, can be performed without human intervention.

(A17) The transport system according to any one of (A1) to (A16), where
 the first moving body has a first engagement portion (claw portion 401, lock pin 402),
 the accommodation portion of the second moving body has a second engagement portion (slit groove 311, lock hole 312), and
 the first engagement portion and the second engagement portion are engaged with each other in a disengageable manner.

According to (A17), the first engagement portion of the first moving body and the second engagement portion of the accommodation portion are engaged with each other in a disengageable manner. Therefore, the first moving body can be fixed to the accommodation portion.

(A18) The transport system according to (A17), where
 the first engagement portion is provided so as to be displaceable between an engaged position and a non-engaged position, and is engaged with the second engagement portion at the engaged position in a state where the first moving body is stopped.

According to (A18), at the time of autonomous movement of the first moving body, the first engagement portion is located in the non-engaged position, and in the state where the first moving body is stopped, the first engagement portion is located in the engaged position and is engaged with the second engagement portion. Therefore, at the time of the autonomous movement of the first moving body, the first engagement portion can be prevented from interfering with the autonomous movement of the first moving body.

(A19) The transport system according to (A17) or (A18), where
 the second engagement portion has a slit groove (slit groove 311) recessed substantially linearly in a floor of the accommodation portion, and the first engagement portion has a claw portion (claw portion 401) which is engaged with the slit groove.

According to (A19), the second engagement portion has the slit groove recessed substantially linearly in the floor of the accommodation portion and the first engagement portion has the claw portion which is engaged with the slit groove. Therefore, the first moving body can be quickly engaged and disengaged and firmly fixed to the floor of the accommodation portion.

(A20) The transport system according to any one of (A1) to (A19), where the first moving body, is a vehicle having a wheel, and can autonomously travel inside the accommodation portion of the second moving body.

According to (A20), the first moving body is a vehicle having a wheel and can autonomously travel inside the accommodation portion of the second moving body. Therefore, the first moving body can be easily arranged and fixed in the optimal position of the accommodation portion of the second moving body without human intervention.

(A21) A moving body (energy storage device 40) capable of autonomously moving which is accommodated in an accommodation portion (accommodation portion 31) of another moving body (moving body 30) and transported by the other moving body, including:

an acquiring unit which acquires at least one of a moving state and an operating state of the other moving body; and a position changing unit which autonomously moves inside the accommodation portion and changes a position in the accommodation portion based on at least one of the moving state and the operating state of the other moving body acquired by the acquiring unit.

According to (A21), the moving body autonomously moves inside the accommodation portion of the other moving body and changes the position in the accommodation portion of the other moving body. Therefore, the moving body can be quickly arranged and fixed in the optimal position of the accommodation portion of the other moving body without human intervention.

(A22) A transport method in which an autonomously movable moving body (energy storage device 40) is accommodated in an accommodation portion (accommodation portion 31) of another moving body (moving body 30) and transported by the other moving body, including the steps of:

acquiring at least one of a moving state and an operating state of the other moving body; and changing a position of the moving body in the accommodation portion by autonomously moving the moving body inside the accommodation portion based on at least one of the moving state and the operating state of the other moving body acquired in the step of acquiring.

According to (A22), the position of the moving body in the accommodation portion of the other moving body can be changed by autonomously moving the moving body inside the accommodation portion of the other moving body. Therefore, the moving body can be quickly arranged and fixed in the optimal position of the accommodation portion of the other moving body without human intervention.

(A23) A transport program for accommodating an autonomously movable moving body (energy storage device 40) in an accommodation portion (accommodation portion 31) of another moving body (moving body 30) and transporting the moving body by the other moving body, including the steps of;

acquiring at least one of a moving state and an operating state of the other moving body; and changing a position of the moving body in the accommodation portion by autonomously moving the moving body inside the accommodation portion based on at least one of the moving state and the operating state of the other moving body acquired in the step of acquiring.

According to (A23), the position of the moving body in the accommodation portion of the other moving body can be changed by autonomously moving the moving body inside the accommodation portion of the other moving body. Therefore, the moving body can be quickly arranged and fixed in the optimal position of the accommodation portion of the other moving body without human intervention.

(A24) A recording medium on which the transport program according to (A23) is recorded.

According to (A24), the transport program can be easily executed by causing a computer to read the recording medium on which the transport program is recorded.

This application is based on a Japanese patent application filed on Mar. 29, 2019 (Japanese Patent Application No. 2019-068616), the contents of which are incorporated herein by reference.

DESCRIPTION OF REFERENCE NUMERALS AND CHARACTERS

1, 1A: energy storage device transport system (transport system)
30: moving body (second moving body, another moving bodies)
30S: slope (auxiliary portion)
31: accommodation portion
31A: energy transmission and reception area
311: slit groove (second engagement portion)
312: lock hole (second engagement portion)
34: energy storage unit (second energy storage unit)
40: energy storage device (first moving body, moving body)
401: claw portion (first engagement portion)
402: lock pin (first engagement portion)
41: energy storage unit (first energy storage unit)
46: loading unit
70: transported object

The invention claimed is:

1. A transport system comprising:

a first moving body which can move autonomously; and a second moving body which has an accommodation portion for accommodating the first moving body, wherein:

the second moving body accommodates the first moving body and moves to transport the first moving body;

the first moving body autonomously moves from a first position inside the accommodation portion of the second moving body to a second position as a destination inside the accommodation portion and changes a position inside the accommodation portion of the second moving body;

the first moving body includes a first wireless communication unit;

the second moving body includes a traveling state acquisition unit configured to acquire information on a traveling state of the second moving body, and a second wireless communication unit configured to transmit the information on the traveling state acquired by the traveling state acquisition unit;

the information on the traveling state of the second moving body is at least one of velocity and acceleration of the second moving body; and the first moving body changes the position during the movement of the second moving body, when at least one of the velocity and the acceleration of the second moving body is equal to or less than a predetermined value, by:

autonomously moving inside the accommodation portion of the second moving body based on the traveling state of the second moving body indicated in the information received by the first wireless communication unit; or autonomously moving inside the accommodation portion of the second moving body according to a control signal received by the first wireless communication unit when the first wireless communication unit receives the control signal generated based on the traveling state of the second moving body.

2. The transport system according to claim 1, wherein the first moving body changes the position by autonomously moving inside the accommodation portion of the second moving body based on a movement environment around the second moving body.

3. The transport system according to claim 2, wherein the movement environment around the second moving body is at least one of traffic information around the second moving body and moving infrastructure information around the second moving body.

4. The transport system according to claim 1, wherein:
the first moving body includes a first energy storage unit and transports energy stored in the first energy storage unit from a transport source to a transport destination; and at least one of the transport source and the transport destination, the first moving body, outputs the energy stored in the first energy storage unit to the outside, inputs external energy to the first energy storage unit, unloads the first energy storage unit from the first moving body, or loads the first energy storage unit on the first moving body.

5. The transport system according to claim 4, wherein the first moving body changes the position by autonomously moving inside the accommodation portion of the second moving body based on a remaining amount of energy stored in the first energy storage unit.

6. The transport system according to claim 4, wherein the first moving body changes the position by autonomously moving inside the accommodation portion of the second moving body based on an energy demand amount of the transport destination.

7. The transport system according to claim 4, wherein:
the second moving body includes a second energy storage unit; and
the first energy storage unit of the first moving body and the second energy storage unit of the second moving body are provided so that energy can be transmitted and received to and from each other.

8. The transport system according to claim 7, wherein:
the accommodation portion of the second moving body has an energy transmission and reception area where the first energy storage unit and the second energy storage unit transmit and receive energy to and from each other; and
the first moving body autonomously moves inside the accommodation portion of the second moving body and changes the position so that the position is within the energy transmission and reception area when the first energy storage unit and the second energy storage unit transmit and receive energy to and from each other.

9. The transport system according to claim 4, wherein:
the accommodation portion of the second moving body is provided so as to be able to accommodate a plurality of the first moving bodies; and
the first energy storage unit of the first moving body is provided so as to be able to transmit and receive energy to and from the first energy storage unit of a different first moving body.

10. The transport system according to claim 1, wherein the first moving body includes a loading unit which loads a transported object.

11. The transport system according to claim 10, wherein the first moving body changes the position by autonomously moving inside the accommodation portion of the second moving body based on transport destination information of the transported object.

12. The transport system according to claim 10, wherein the first moving body changes the position by autonomously moving inside the accommodation portion of the second moving body based on content information of the transported object.

13. The transport system according to claim 1, wherein the second moving body includes an auxiliary portion which allows the first moving body to be able to autonomously move between the inside and the outside of the accommodation portion.

14. The transport system according to claim 1, wherein:
the first moving body has a first engagement portion;
the accommodation portion of the second moving body has a second engagement portion; and
the first engagement portion and the second engagement portion are engaged with each other in a disengageable manner.

15. The transport system according to claim 14, wherein the first engagement portion is provided so as to be displaceable between an engaged position and a non-engaged position, and is engaged with the second engagement portion at the engaged position in a state where the first moving body is stopped.

16. The transport system according to claim 14, wherein:
the second engagement portion has a slit groove recessed substantially linearly in a floor of the accommodation portion; and
the first engagement portion has a claw portion which is engaged with the slit groove.

17. The transport system according to claim 1, wherein:
the first moving body is a vehicle having a wheel, and can autonomously travel inside the accommodation portion of the second moving body.

18. The transport system according to claim 1, wherein the first moving body starts autonomously moving from the first position in a state where the first moving body is stopped, and stops at the second position as the destination.

19. A moving body capable of autonomously moving which is accommodated in an accommodation portion of another moving body and transported by the other moving body, comprising:

a position changing unit which autonomously moves from a first position inside the accommodation portion of the other moving body to a second position as a destination inside the accommodation portion of the other moving body and changes a position inside the accommodation portion of the other moving body, wherein:

the moving body includes a first wireless communication unit;

the other moving body includes a traveling state acquisition unit configured to acquire information on a traveling state of the other moving body, and a second wireless communication unit configured to transmit the information on the traveling state acquired by the traveling state acquisition unit or transmit a control signal for the moving body, the control signal being generated based on information on the traveling state acquired by the traveling state acquisition unit;

the information on the traveling state acquired by the traveling state acquisition unit is at least one of velocity and acceleration of the other moving body; and the moving body changes the position during the movement of the other moving body, when at least one of the velocity and the acceleration of the other moving body is equal to or less than a predetermined value, by:

autonomously moving inside the accommodation portion of the other moving body based on the traveling state of the other moving body indicated in the information received by the first wireless communication unit; or autonomously moving inside the accommodation portion of the other moving body according to the control signal received by the first wireless communication unit when the first wireless communication unit receives the control signal generated based on the traveling state of the other moving body.

20. A transport method in which an autonomously movable moving body is accommodated in an accommodation portion of another moving body and transported by the other moving body, comprising:

a position changing step for changing a position of the moving body inside the accommodation portion of the other moving body by autonomously moving the moving body from a first position inside the accommodation portion of the other moving body to a second position as a destination inside the accommodation portion of the other moving body;

an acquiring step for acquiring, by a traveling state acquisition unit of the other moving body, information on a traveling state of the other moving body; and a transmitting step for transmitting, by a second wireless communication unit of the other moving body, the information on the traveling state of the other moving body or transmitting a control signal for the moving body, the control signal being generated based on the information on the traveling state of the other moving body, wherein the information on the traveling state of the other moving body is at least one of velocity and acceleration of the other moving body, and wherein, in the position changing step, the moving body changes the position during the movement of the other moving body, when at least one of the velocity and the acceleration of the other moving body is equal to or less than a predetermined value, by:

autonomously moving inside the accommodation portion of the other moving body based on the traveling state of the other moving body indicated in the information acquired in the acquiring step and received by a first wireless communication unit of the moving body; or autonomously moving inside the accommodation portion of the other moving body according to the control signal received by a first wireless communication unit of the moving body when the first wireless communication unit receives the control signal generated based on the traveling state of the other moving body.

21. A computer program product, for accommodating an autonomously movable moving body in an accommodation portion of another moving body and transporting the moving body by the other moving body, comprising a non-transitory computer readable storage medium having instructions encoded thereon that, when executed by a processor, cause the processor to execute a process, the process comprising:

a position changing step for changing a position of the moving body inside the accommodation portion of the other moving body by autonomously moving the moving body from a first position inside the accommodation portion of the other moving body to a second position as a destination inside the accommodation portion of the other moving body:

an acquiring step for acquiring, by a traveling state acquisition unit of the other moving body, information on a traveling state of the other moving body; and a transmitting step for transmitting, by a second wireless communication unit of the other moving body, the information on the traveling state of the other moving body or transmitting a control signal for the moving body, the control signal being generated based on the information on the traveling state of the other moving body, wherein the information on the traveling state of the other moving body is at least one of velocity and acceleration of the other moving body, and wherein, in the position changing step, the moving body changes the position during the movement of the other moving body, when at least one of the velocity and the acceleration of the other moving body is equal to or less than a predetermined value, by:

autonomously moving inside the accommodation portion of the other moving body based on the traveling state of the other moving body indicated in the information acquired in the acquiring step and received by a first wireless communication unit of the moving body, or autonomously moving inside the accommodation portion of the other moving body according to the control signal received by a first wireless communication unit of the moving body when the first wireless communication unit receives the control signal generated based on the traveling state of the other moving body.

* * * * *